(12) United States Patent  (10) Patent No.: US 8,867,170 B1
Sasaki et al.  (45) Date of Patent: Oct. 21, 2014

(54) MULTILAYER PLASMON GENERATOR

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Ryuji Fujii, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/942,074

(22) Filed: Jul. 15, 2013

(51) Int. Cl.
 *G11B 5/147* (2006.01)
(52) U.S. Cl.
 USPC ........................................................ 360/125.3
(58) Field of Classification Search
 USPC ........................................................ 360/125.3
 See application file for complete search history.

(56) References Cited

U.S. PATENT DOCUMENTS

| | | | |
|---|---|---|---|
| 7,106,664 B2 | 9/2006 | Hasegawa et al. | |
| 7,444,054 B2 | 10/2008 | Challener | |
| 7,864,434 B2 | 1/2011 | Peng | |
| 8,208,214 B2 | 6/2012 | Iwata et al. | |
| 8,243,558 B2 | 8/2012 | Komura et al. | |
| 8,482,879 B1 * | 7/2013 | Sasaki et al. | 360/123.03 |
| 8,488,419 B1 | 7/2013 | Jin et al. | |
| 8,588,040 B1 * | 11/2013 | Fujita et al. | 369/13.33 |
| 8,767,348 B1 * | 7/2014 | Tanaka et al. | 360/125.31 |
| 2008/0056660 A1 | 3/2008 | Lee et al. | |
| 2009/0295510 A1 | 12/2009 | Miyazaki et al. | |
| 2011/0038236 A1 | 2/2011 | Mizuno et al. | |
| 2011/0170381 A1 | 7/2011 | Matsumoto | |
| 2011/0249546 A1 | 10/2011 | Choo et al. | |
| 2011/0286128 A1 | 11/2011 | Tsutsumi et al. | |
| 2012/0008229 A1 | 1/2012 | Zhou et al. | |
| 2013/0148485 A1 | 6/2013 | Jin et al. | |
| 2013/0279315 A1 | 10/2013 | Zhao et al. | |
| 2013/0320470 A1 | 12/2013 | Nakajima et al. | |

OTHER PUBLICATIONS

U.S. Appl. No. 13/846,278, filed Mar. 18, 2013 in the name of Yoshitaka Sasaki et al.
U.S. Appl. No. 13/846,337, filed Mar. 18, 2013 in the name of Yoshitaka Sasaki et al.
May 9, 2014 Office Action issued in U.S. Appl. No. 13/846,278.
Jan. 29, 2014 Office Action issued in U.S. Appl. No. 13/846,337.

\* cited by examiner

*Primary Examiner* — Mark Blouin
(74) *Attorney, Agent, or Firm* — Oliff PLC

(57) ABSTRACT

A plasmon generator has a front end face located in a medium facing surface of a magnetic head. The plasmon generator includes a metal portion and a multilayer film portion. The metal portion has a bottom surface, a top surface, and an end face facing toward the front end face. The multilayer film portion includes a first metal layer, a second metal layer and an intermediate layer, and covers the top surface and the end face of the metal portion. The intermediate layer is formed of a material that is higher in Vickers hardness than the metal material used to form the metal portion, the metal material used to form the first metal layer and the metal material used to form the second metal layer.

22 Claims, 22 Drawing Sheets

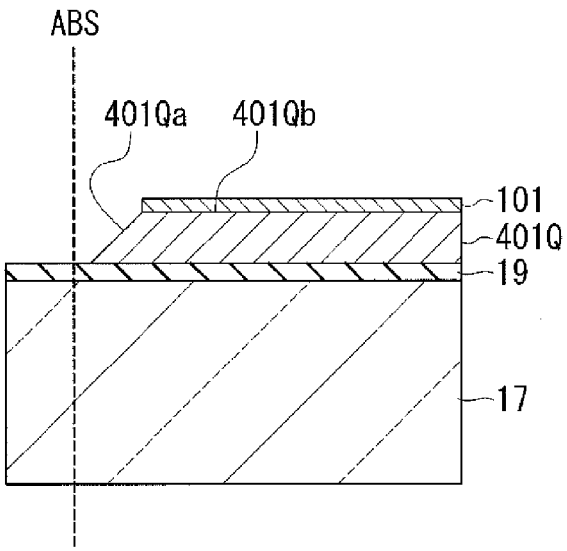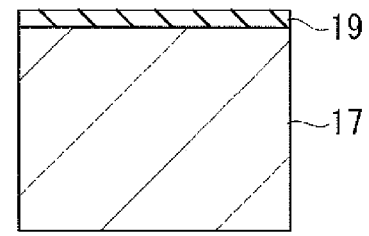
FIG. 11A          FIG. 11B
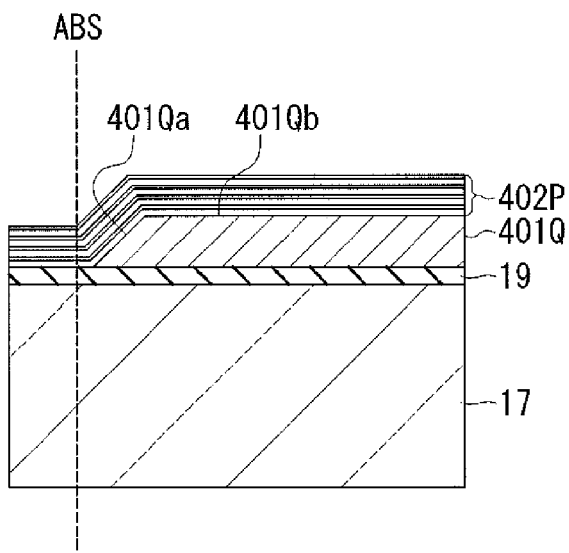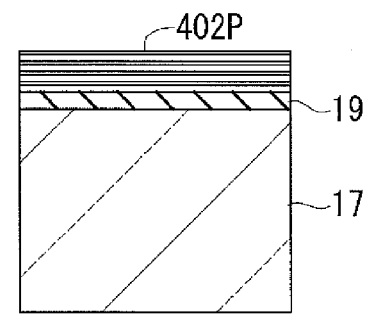
FIG. 12A          FIG. 12B

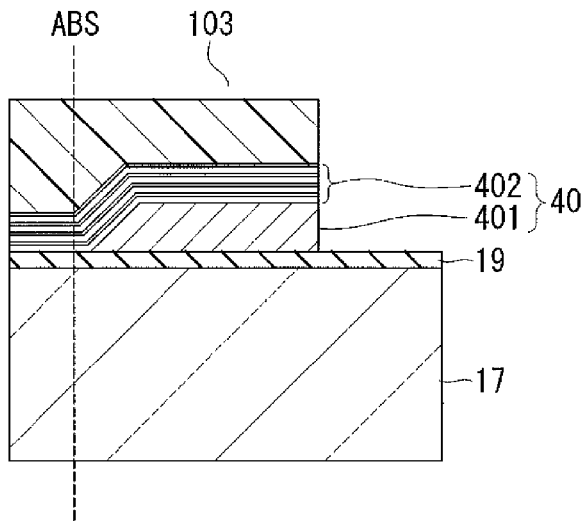 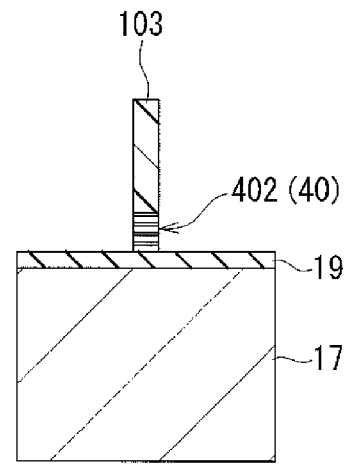
FIG. 13A  FIG. 13B
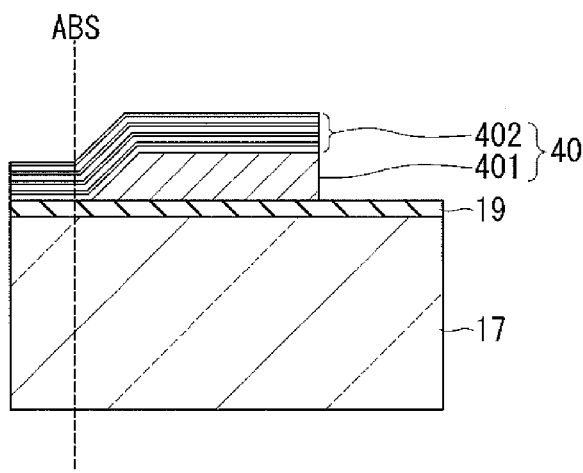 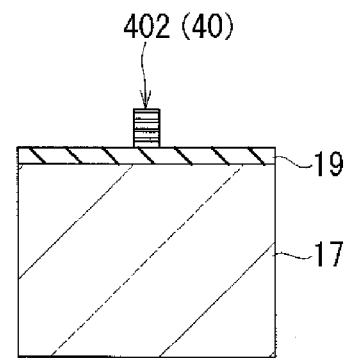
FIG. 14A  FIG. 14B

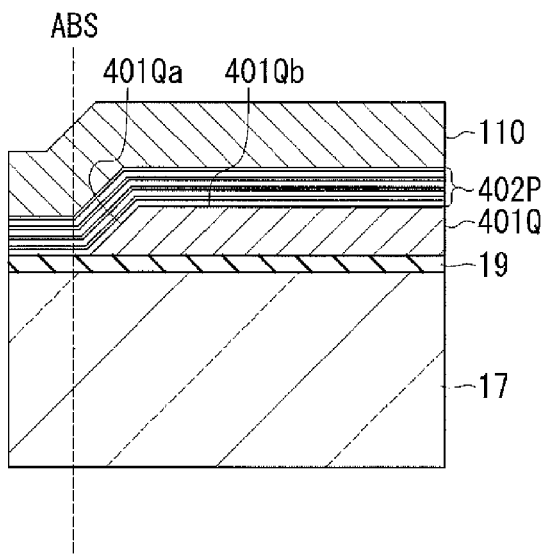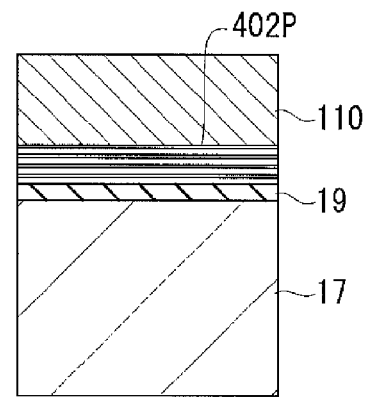
FIG. 18A  FIG. 18B
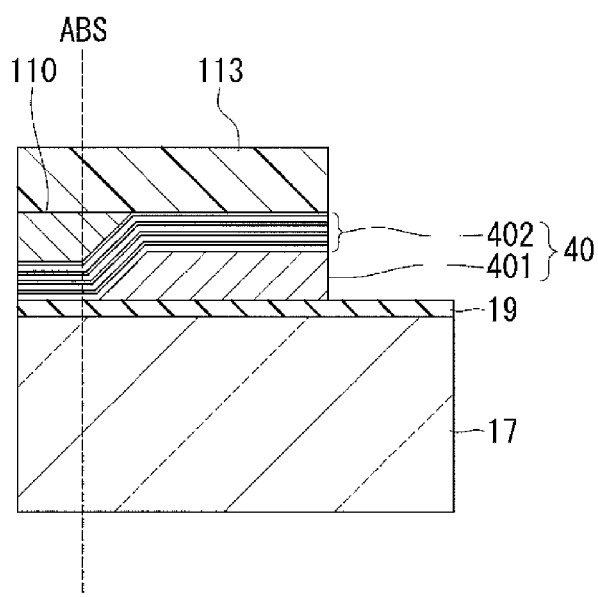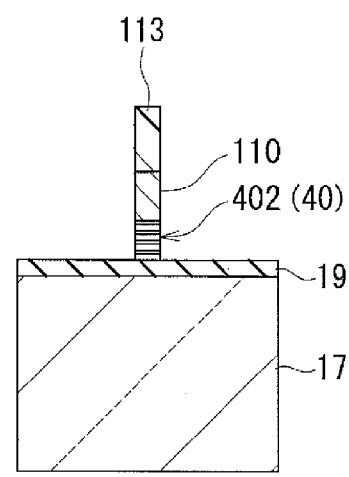
FIG. 19A  FIG. 19B

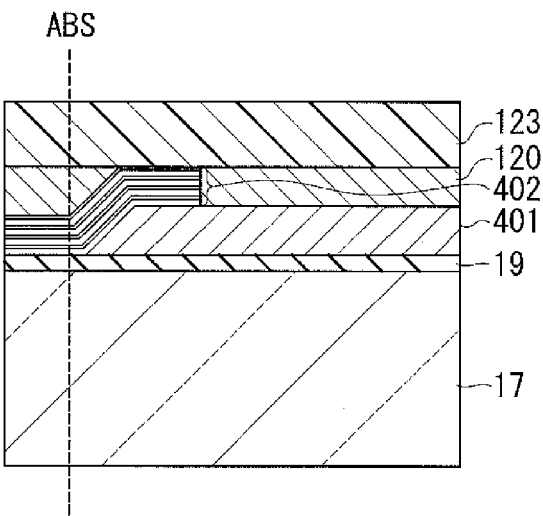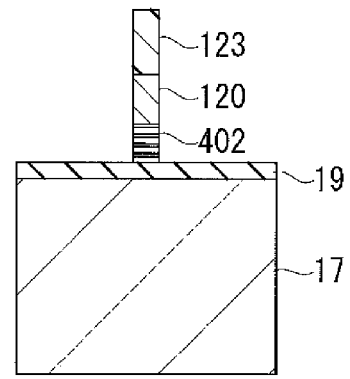
FIG. 28A  FIG. 28B
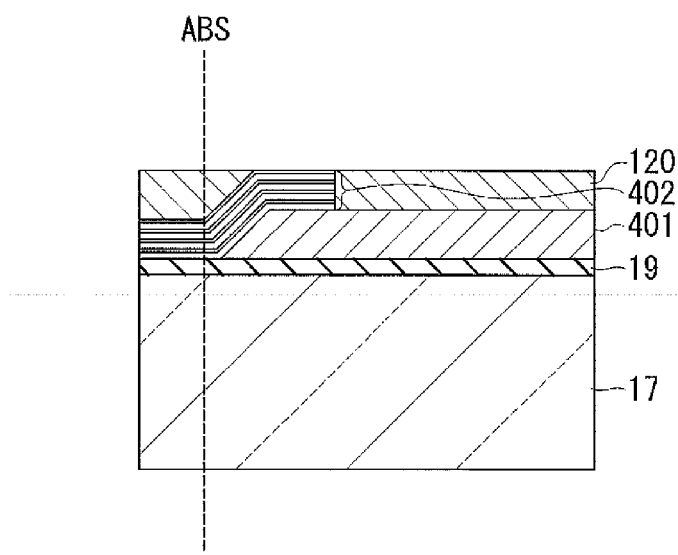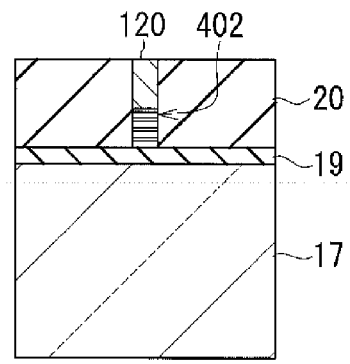
FIG. 29A  FIG. 29B

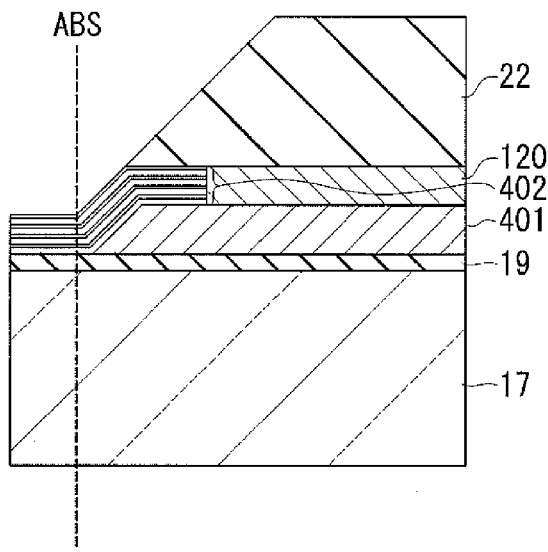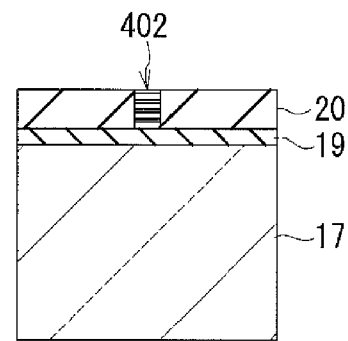
FIG. 30A        FIG. 30B
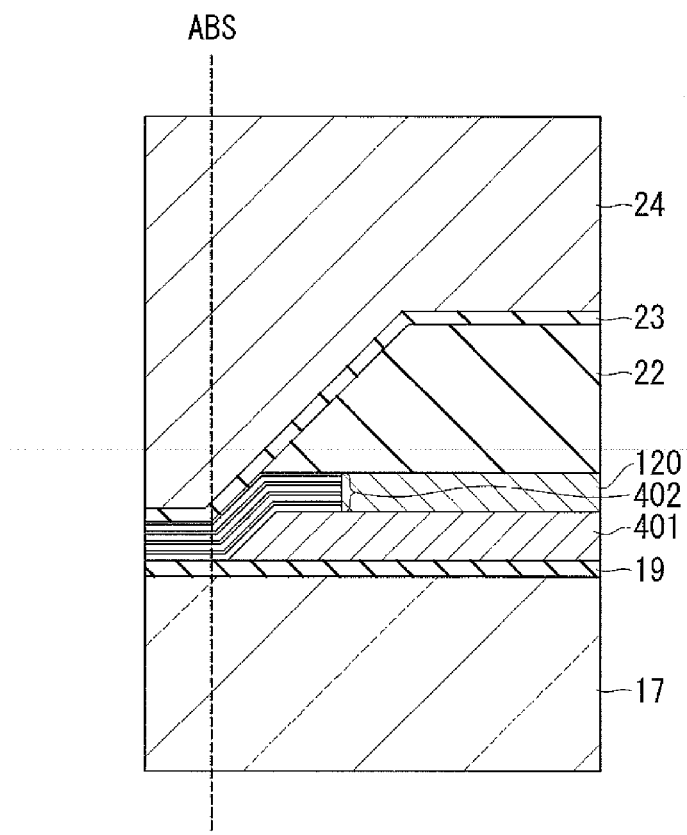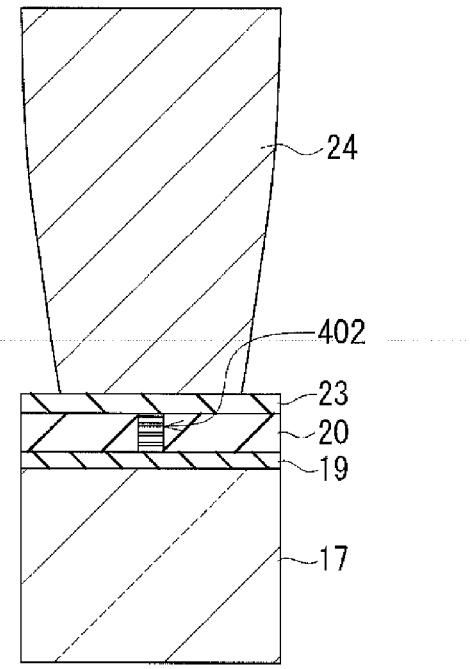
FIG. 31A        FIG. 31B

MULTILAYER PLASMON GENERATOR

BACKGROUND OF THE INVENTION

1. Field of the Invention

The present invention relates to a plasmon generator for use in thermally-assisted magnetic recording in which a recording medium is irradiated with near-field light to lower the coercivity of the recording medium for data writing, and to a thermally-assisted magnetic recording head including the plasmon generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, a thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near a medium facing surface of the slider.

The plasmon generator has a front end face located in the medium facing surface. The front end face generates near-field light. Surface plasmons are excited on the plasmon generator and propagate along the surface of the plasmon generator to reach the front end face. As a result, the surface plasmons concentrate at the front end face, and near-field light is generated from the front end face based on the surface plasmons.

U.S. Patent Application Publication No. 2011/0170381 A1 discloses a technology in which the surface of a waveguide and the surface of a metallic structure (plasmon generator) are arranged to face each other with a gap therebetween, and evanescent light that occurs at the surface of the waveguide based on the light propagating through the waveguide is used to excite surface plasmons on the metallic structure, so that near-field light is generated based on the excited surface plasmons. Further, U.S. Patent Application Publication No. 2011/0170381 A1 discloses forming a part of the metallic structure from a material different from that of other parts of the metallic structure.

Materials that are typically employed for plasmon generators are metals having high electrical conductivities, such as Au and Ag. However, Au and Ag are relatively soft and have relatively high thermal expansion coefficients. Thus, the following problems arise if a plasmon generator is formed entirely of Au or Ag.

In the process of manufacturing a thermally-assisted magnetic recording head, the medium facing surface is formed by polishing. During polishing, polishing residues of metal materials may grow to cause smears. To remove the smears, the polished surface is slightly etched by, for example, ion beam etching in some cases. If the plasmon generator is formed entirely of Au or Ag, which are relatively soft, the polishing and etching mentioned above may cause the front end face of the plasmon generator to be significantly recessed relative to the other parts of the medium facing surface. In such a case, the front end face of the plasmon generator becomes distant from the recording medium, and the heating performance of the plasmon generator is thus degraded.

Part of the energy of light guided to the plasmon generator through the waveguide is transformed into heat in the plasmon generator. Part of the energy of near-field light generated by the plasmon generator is also transformed into heat in the plasmon generator. The plasmon generator thus rises in temperature during the operation of the thermally-assisted magnetic recording head. If the plasmon generator is formed entirely of Au or Ag, the rise in temperature of the plasmon generator causes the plasmon generator to expand and significantly protrude toward the recording medium. This in turn may cause a protective film covering the medium facing surface to come into contact with the recording medium and thereby damage the recording medium or be broken. When the protective film is broken, the plasmon generator may be damaged by contact with the recording medium or may be corroded by contact with high temperature air.

Further, the plasmon generator formed entirely of Au or Ag may be deformed due to aggregation when its temperature rises. In addition, such a plasmon generator expands when its temperature rises and then contracts when its temperature drops. When the plasmon generator undergoes such a process, the front end face of the plasmon generator may be significantly recessed relative to the other parts of the medium facing surface. In such a case, the heating performance of the plasmon generator is degraded as mentioned above.

For the various reasons described above, the plasmon generator formed entirely of Au or Ag has the drawback of being low in reliability.

U.S. Patent Application Publication No. 2011/0170381 A1 discloses a metallic structure composed of a main body and a layer having a greater hardness than the main body (this layer will hereinafter be referred to as the hard layer). In this metallic structure, the main body is not exposed in the medium facing surface, but the hard layer is exposed in the medium facing surface. In this metallic structure, surface plasmons are generated in the main body. The generated surface plasmons propagate to the hard layer, and near-field light is generated from the vertex of the hard layer. This metallic structure has the drawback that there is a great loss of the surface plasmons as they propagate from the main body to the hard layer, and it is thus difficult to allow the surface plasmons to efficiently propagate to the vertex.

OBJECT AND SUMMARY OF THE INVENTION

It is an object of the present invention to provide a plasmon generator of high reliability that allows surface plasmons to propagate to the front end face efficiently, and to provide a thermally-assisted magnetic recording head having such a plasmon generator.

A plasmon generator of the present invention has a front end face. The plasmon generator includes a metal portion and a multilayer film portion. The metal portion has a bottom surface, a top surface opposite to the bottom surface, and an end face facing toward the front end face. The multilayer film portion includes a first metal layer, a second metal layer and an intermediate layer, and covers the end face and at least part of the top surface of the metal portion. The intermediate layer is interposed between the first metal layer and the second metal layer. Each of the first metal layer, the second metal layer and the intermediate layer has an end located in the front end face. Each of the metal portion, the first metal layer and the second metal layer is formed of a metal material. The intermediate layer is formed of a material that is higher in Vickers hardness than the metal material used to form the metal portion, the metal material used to form the first metal layer and the metal material used to form the second metal layer. The metal portion is greater in thickness than the first metal layer, the second metal layer and the intermediate layer. The plasmon generator is configured so that a surface plasmon is excited on the bottom surface of the metal portion through coupling with evanescent light generated from a core through which light propagates, and the front end face generates near-field light based on the surface plasmon.

A thermally-assisted magnetic recording head of the present invention includes a medium facing surface facing a recording medium, a main pole producing a write magnetic field for writing data on the recording medium, a waveguide, and a plasmon generator. The waveguide includes a core through which light propagates, and a cladding provided around the core. The plasmon generator has a front end face located in the medium facing surface.

In the thermally-assisted magnetic recording head of the present invention, the plasmon generator includes a metal portion and a multilayer film portion. The metal portion has a bottom surface, a top surface opposite to the bottom surface, and an end face facing toward the front end face. The multilayer film portion includes a first metal layer, a second metal layer and an intermediate layer, and covers the end face and at least part of the top surface of the metal portion. The intermediate layer is interposed between the first metal layer and the second metal layer. Each of the first metal layer, the second metal layer and the intermediate layer has an end located in the front end face. Each of the metal portion, the first metal layer and the second metal layer is formed of a metal material. The intermediate layer is formed of a material that is higher in Vickers hardness than the metal material used to form the metal portion, the metal material used to form the first metal layer and the metal material used to form the second metal layer. The metal portion is greater in thickness than the first metal layer, the second metal layer and the intermediate layer. The plasmon generator is configured so that a surface plasmon is excited on the bottom surface of the metal portion through coupling with evanescent light generated from the core, and the front end face generates near-field light based on the surface plasmon.

In the plasmon generator and the thermally-assisted magnetic recording head of the present invention, the end face of the metal portion may be inclined relative to the front end face.

The plasmon generator of the present invention and the plasmon generator in the thermally-assisted magnetic recording head of the present invention may further include a metal film formed of a metal material and stacked on the multilayer film portion. In such a case, the metal film has an end located in the front end face.

In the plasmon generator and the thermally-assisted magnetic recording head of the present invention, the metal portion may have a first end farthest from the front end face, and the multilayer film portion may have a second end farthest from the front end face. In such a case, the distance from the front end face to the second end may be smaller than the distance from the front end face to the first end. Furthermore, in this case, the plasmon generator may further include a metal film formed of a metal material and disposed on a part of the top surface of the metal portion that is located farther from the front end face than is the second end.

In the plasmon generator and the thermally-assisted magnetic recording head of the present invention, no part of the metal portion may constitute any part of the front end face.

In the plasmon generator and the thermally-assisted magnetic recording head of the present invention, the intermediate layer may be smaller in thickness than the first and second metal layers. The material used to form the intermediate layer may be a metal material different from the metal material used to form the metal portion, the metal material used to form the first metal layer and the metal material used to form the second metal layer, or may be a dielectric material.

In the thermally-assisted magnetic recording head of the present invention, the core may have an evanescent light generating surface that generates evanescent light based on the light propagating through the core. In such a case, the cladding may include an interposition part interposed between the evanescent light generating surface and the bottom surface of the metal portion.

A method of manufacturing the plasmon generator of the present invention includes the steps of: forming an initial metal portion that later becomes the metal portion; forming a multilayer film to cover at least part of the initial metal portion, the multilayer film becoming the multilayer film portion later; and patterning the initial metal portion and the multilayer film so that the initial metal portion is made into the metal portion and the multilayer film is made into the multilayer film portion.

The method of manufacturing the plasmon generator of the present invention may further include the step of forming a metal film on the multilayer film between the step of forming the multilayer film and the step of patterning, the metal film having a thickness equal to or greater than the thickness of the initial metal portion, and the step of planarizing top surfaces of the metal film and the multilayer film between the step of forming the metal film and the step of patterning. In such a case, the initial metal portion, the multilayer film and the metal film are patterned in the step of patterning. Furthermore, in this case, the method of manufacturing the plasmon generator may further include the step of removing at least part of the metal film after the step of patterning.

The present invention makes it possible to provide a plasmon generator of high reliability that allows surface plasmons to propagate to the front end face efficiently, and to provide a thermally-assisted magnetic recording head having such a plasmon generator.

Other and further objects, features and advantages of the present invention will appear more fully from the following description.

BRIEF DESCRIPTION OF THE DRAWINGS

FIG. 11A and FIG. 11B are cross-sectional views showing a step that follows the step shown in FIG. 10A and FIG. 10B.

FIG. 12A and FIG. 12B are cross-sectional views showing a step that follows the step shown in FIG. 11A and FIG. 11B.

FIG. 13A and FIG. 13B are cross-sectional views showing a step that follows the step shown in FIG. 12A and FIG. 12B.

FIG. 14A and FIG. 14B are cross-sectional views showing a step that follows the step shown in FIG. 13A and FIG. 13B.

FIG. 18A and FIG. 18B are cross-sectional views showing a step of a method of manufacturing a thermally-assisted magnetic recording head according to a second embodiment of the invention.

FIG. 19A and FIG. 19B are cross-sectional views showing a step that follows the step shown in FIG. 18A and FIG. 18B.

FIG. 28A and FIG. 28B are cross-sectional views showing a step that follows the step shown in FIG. 27A and FIG. 27B.

FIG. 29A and FIG. 29B are cross-sectional views showing a step that follows the step shown in FIG. 28A and FIG. 28B.

FIG. 30A and FIG. 30B are cross-sectional views showing a step that follows the step shown in FIG. 29A and FIG. 29B.

FIG. 31A and FIG. 31B are cross-sectional views showing a step that follows the step shown in FIG. 30A and FIG. 30B.

DETAILED DESCRIPTION OF THE PREFERRED EMBODIMENTS

First Embodiment

Figure 5:
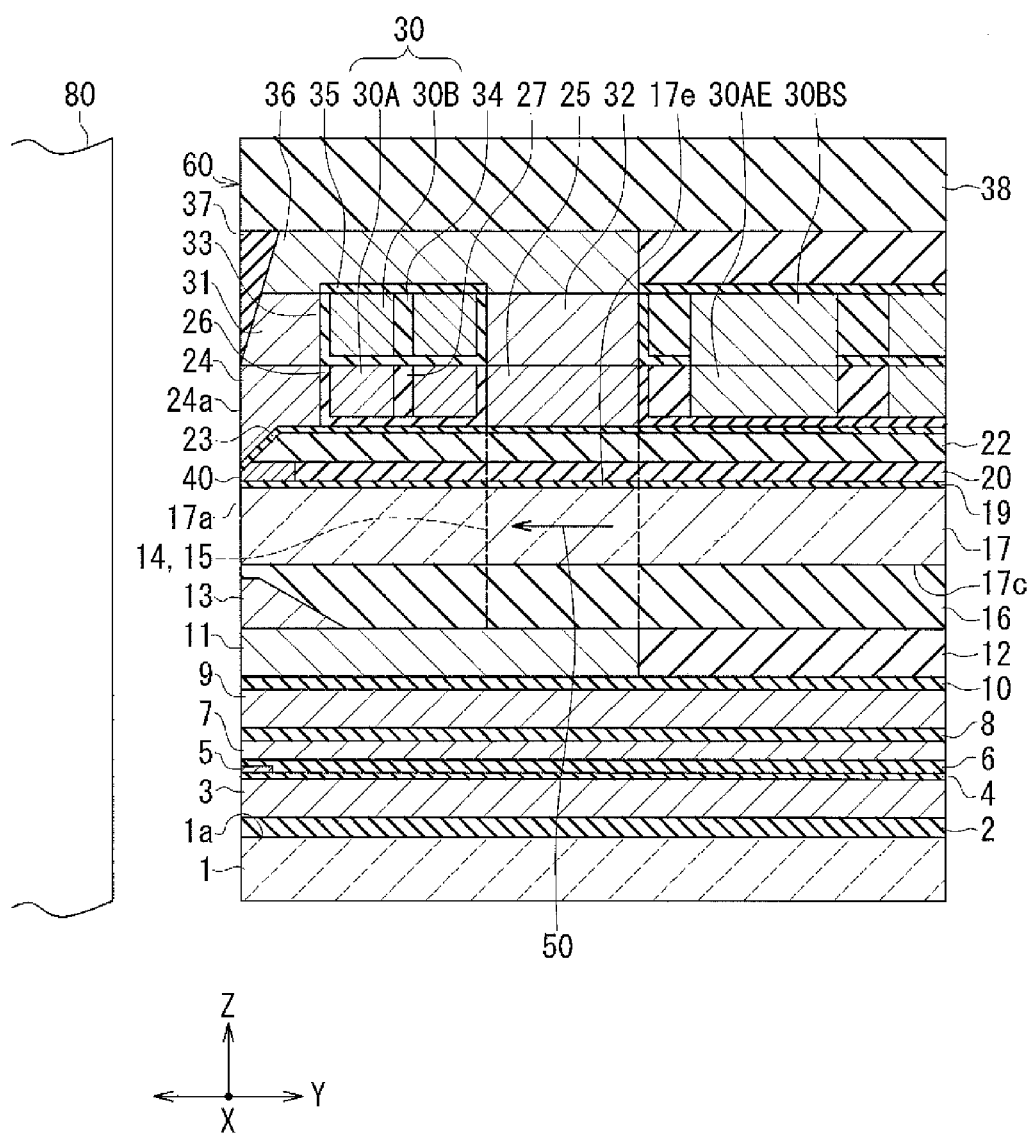
FIG. 5 is a cross-sectional view showing the configuration of the thermally-assisted magnetic recording head according to the first embodiment of the invention.
Figure 6:
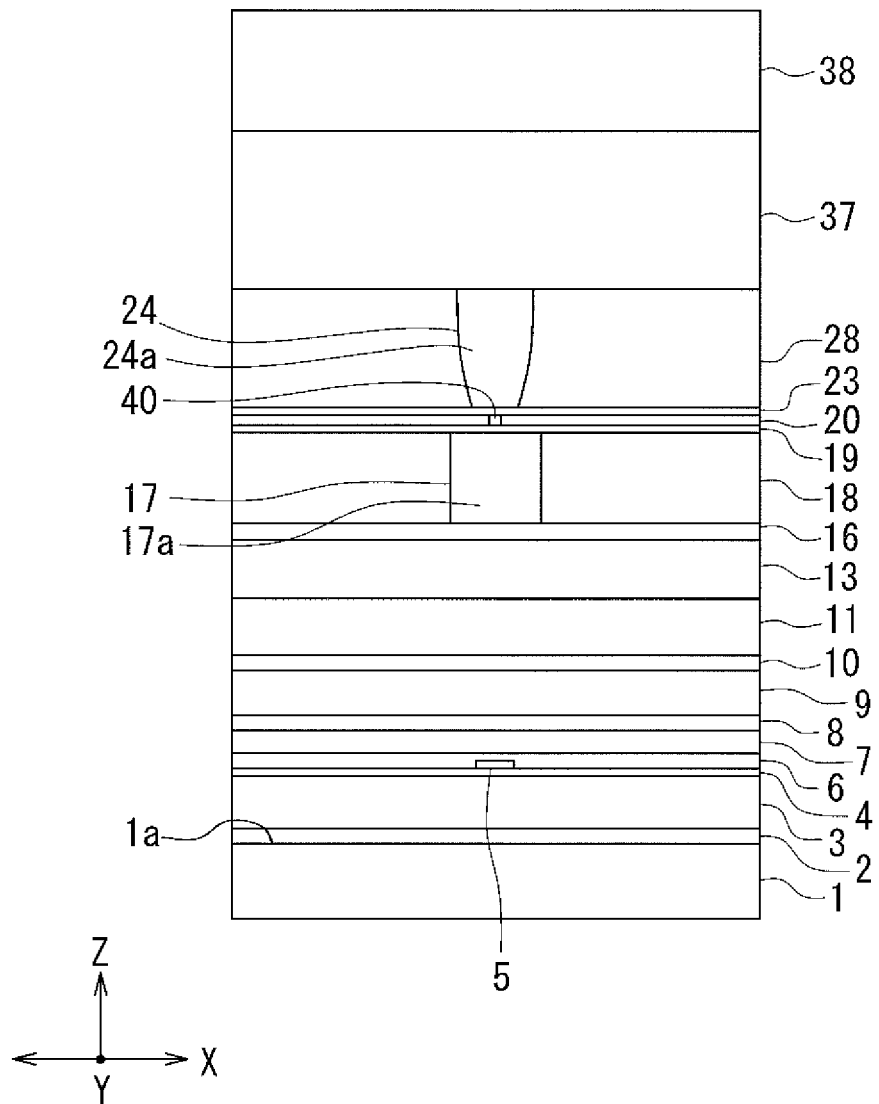
FIG. 6 is a front view showing the medium facing surface of the thermally-assisted magnetic recording head according to the first embodiment of the invention.

Preferred embodiments of the present invention will now be described in detail with reference to the drawings. First, reference is made to FIG. 5 and FIG. 6 to describe the configuration of a thermally-assisted magnetic recording head according to a first embodiment of the invention. The thermally-assisted magnetic recording head according to the present embodiment includes a plasmon generator according to the present embodiment. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 5, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 5 and FIG. 6, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, and a nonmagnetic layer 10 formed of a nonmagnetic material and disposed on the middle shield layer 9. The insulating layer 8 and the nonmagnetic layer 10 are formed of alumina, for example.

The thermally-assisted magnetic recording head further includes a yoke layer 11 formed of a magnetic material and disposed on the nonmagnetic layer 10, and an insulating layer 12 disposed on the nonmagnetic layer 10 and surrounding the yoke layer 11. The yoke layer 11 has an end face located in the medium facing surface 60. The insulating layer 12 is formed of alumina, for example.

The thermally-assisted magnetic recording head further includes a shield layer 13 located close to the medium facing surface 60 and lying on the yoke layer 11, and a first coupling portion 14 and a second coupling portion 15 disposed away from the medium facing surface 60 and lying on the yoke layer 11. Each of the shield layer 13, the first coupling portion 14 and the second coupling portion 15 is formed of a magnetic material. The shield layer 13 has an end face located in the medium facing surface 60. Each of the coupling portions 14 and 15 includes a first layer, a second layer and a third layer.

The thermally-assisted magnetic recording head further includes a waveguide. The waveguide includes a core 17 through which light propagates, and a cladding provided around the core 17. The cladding includes cladding layers 16, 18 and 19. The cladding layer 16 is disposed to cover the yoke layer 11, the insulating layer 12 and the shield layer 13. The core 17 lies on the cladding layer 16. The cladding layer 18 lies on the cladding layer 16 and surrounds the core 17. The cladding layer 19 is disposed over the core 17 and the cladding layer 18.

The core 17 is formed of a dielectric material that transmits laser light to be used for generating near-field light. The laser light emitted from a laser diode (not illustrated) enters the core 17 and propagates through the core 17. The cladding layers 16, 18 and 19 are each formed of a dielectric material that has a refractive index lower than that of the core 17. For example, the core 17 may be formed of tantalum oxide such as $Ta_2O_5$ or silicon oxynitride (SiON), while the cladding layers 16, 18 and 19 may be formed of silicon dioxide ($SiO_2$) or alumina.

Parts of the first and second coupling portions 14 and 15 are embedded in the cladding layers 16, 18 and 19. The first coupling portion 14 and the second coupling portion 15 are located on opposite sides of the core 17 in the track width direction (the X direction), each being at a distance from the core 17.

The thermally-assisted magnetic recording head further includes a plasmon generator 40 located near the medium facing surface 60 and lying on the cladding layer 19, and a dielectric layer 20 lying on the cladding layer 19 and surrounding the plasmon generator 40. The plasmon generator 40 is configured to excite surface plasmons on the principle to be described later. The dielectric layer 20 is formed of the same material as the cladding layers 16, 18 and 19, for example. The plasmon generator 40 will be described in detail later.

The thermally-assisted magnetic recording head further includes a dielectric layer 22 lying on the plasmon generator 40 and the dielectric layer 20, and a dielectric layer 23 disposed to cover the plasmon generator 40 and the dielectric layer 22. The dielectric layer 22 has an end face closest to the medium facing surface 60. The distance from the medium facing surface 60 to an arbitrary point on the aforementioned end face of the dielectric layer 22 decreases with decreasing distance from the arbitrary point to the top surface 1a of the substrate 1. The dielectric layer 22 is formed of the same material as the cladding layers 16, 18 and 19, for example. The dielectric layer 23 is formed of alumina, for example. The remainder of the first and second coupling portions 14 and 15 are embedded in the dielectric layers 20, 22 and 23.

The thermally-assisted magnetic recording head further includes a main pole 24 disposed on the dielectric layer 23 with the plasmon generator 40 interposed between the core 17 and the main pole 24, and a coupling layer 25 disposed over the first and second coupling portions 14 and 15 and the dielectric layer 23. The thermally-assisted magnetic recording head further includes a coupling layer 31 disposed on the main pole 24, and a coupling layer 32 disposed on the coupling layer 25. Each of the main pole 24 and the coupling layers 25, 31 and 32 is formed of a magnetic material.

The main pole 24 has an end face 24a located in the medium facing surface 60. The main pole 24 may include a narrow portion having the end face 24a and an end opposite to the end face 24a, and a wide portion connected to the end of the narrow portion. The wide portion is greater than the narrow portion in width in the track width direction (the X direction). The coupling layer 31 has an end face facing toward the medium facing surface 60. The distance from the medium facing surface 60 to an arbitrary point on this end face decreases with decreasing distance from the arbitrary point to the top surface 1a of the substrate 1.

The thermally-assisted magnetic recording head further includes a coil 30. The coil 30 includes a first layer 30A and a second layer 30B. The first layer 30A is wound approximately two turns around the coupling layer 25. The second layer 30B is wound approximately two turns around the coupling layer 32.

The thermally-assisted magnetic recording head further includes insulating layers 26, 27, 28, 33, 34 and 35. The insulating layer 26 isolates the first layer 30A of the coil 30 from the main pole 24, the coupling layer 25 and the dielectric layer 23. The insulating layer 27 is disposed in the space between adjacent turns of the first layer 30A. The insulating layer 28 (see FIG. 6) is disposed around the main pole 24 and the first layer 30A. The insulating layer 33 isolates the second layer 30B of the coil 30 from the coupling layers 31 and 32, the first layer 30A and the insulating layers 26 and 27. The insulating layer 34 is disposed in the space between adjacent turns of the second layer 30B. The insulating layer 35 is disposed over the second layer 30B and the insulating layers 33 and 34. The insulating layers 26, 28, 33 and 35 are formed of alumina, for example. The insulating layers 27 and 34 are formed of a photoresist, for example.

The thermally-assisted magnetic recording head further includes a coupling layer 36 formed of a magnetic material. The coupling layer 36 lies on the coupling layers 31 and 32 and the insulating layer 35, and magnetically couples the coupling layers 31 and 32 to each other. The coupling layer 36 has an end face facing toward the medium facing surface 60. The distance from the medium facing surface 60 to an arbitrary point on this end face decreases with decreasing distance from the arbitrary point to the top surface 1a of the substrate 1. The end face of the coupling layer 36 is contiguous with the end face of the coupling layer 31.

The thermally-assisted magnetic recording head further includes: an insulating layer 37 disposed between the end face of the coupling layer 31 and the medium facing surface 60 and around the second layer 30B and the coupling layer 36; and a protective layer 38 disposed to cover the coupling layer 36 and the insulating layer 37. The insulating layer 37 and the protective layer 38 are formed of alumina, for example.

The parts from the yoke layer 11 to the coupling layer 36 constitute a write head unit. The coil 30 produces a magnetic field corresponding to data to be written on a recording medium. The shield layer 13, the yoke layer 11, the coupling portions 14 and 15, the coupling layers 25, 32, 36 and 31, and the main pole 24 form a magnetic path for passing a magnetic flux corresponding to the magnetic field produced by the coil 30. The main pole 24 allows the magnetic flux corresponding to the magnetic field produced by the coil 30 to pass, and produces a write magnetic field for writing data on the recording medium by means of a perpendicular magnetic recording system.

As has been described, the thermally-assisted magnetic recording head according to the present embodiment includes the medium facing surface 60, the read head unit, and the write head unit. The read head unit and the write head unit are stacked on the substrate 1. The write head unit is located on the front side in the direction of travel of the recording medium 80 (the Z direction), i.e., on the trailing side, relative to the read head unit.

The thermally-assisted magnetic recording head may include a protective film covering the medium facing surface 60. The protective film is formed of diamond-like-carbon (DLC) or $Ta_2O_5$, for example. The protective film is not an essential component of the thermally-assisted magnetic recording head and can be dispensed with.

The write head unit includes the coil 30, the main pole 24, the waveguide, and the plasmon generator 40. The waveguide includes the core 17 and the cladding. The cladding includes the cladding layers 16, 18 and 19. The main pole 24 is located on the front side in the direction of travel of the recording medium 80 (the Z direction) relative to the core 17. The plasmon generator 40 is disposed between the core 17 and the main pole 24.

Figure 1:
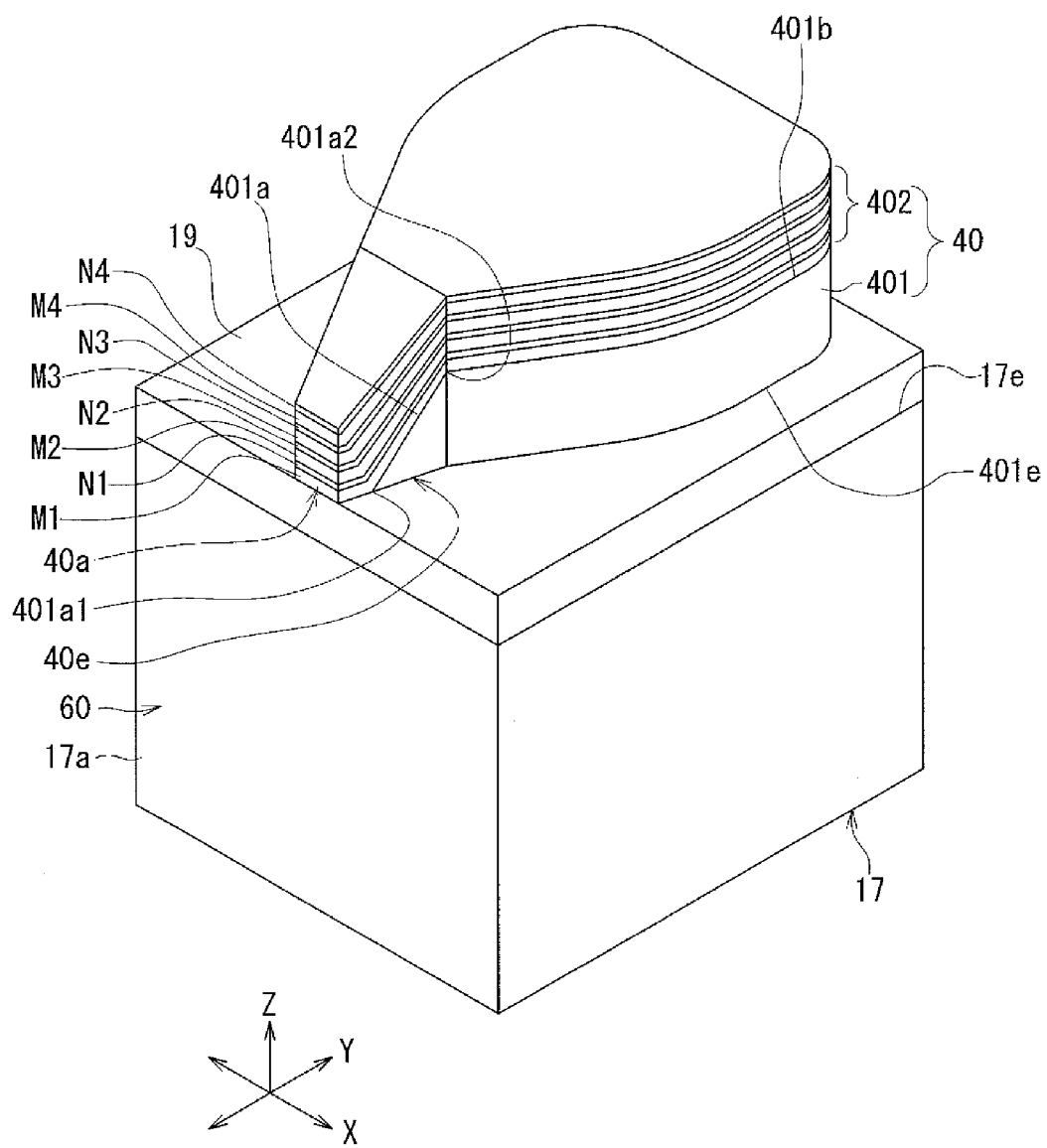
FIG. 1 is a perspective view showing the main part of a thermally-assisted magnetic recording head according to a first embodiment of the invention.
Figure 2:
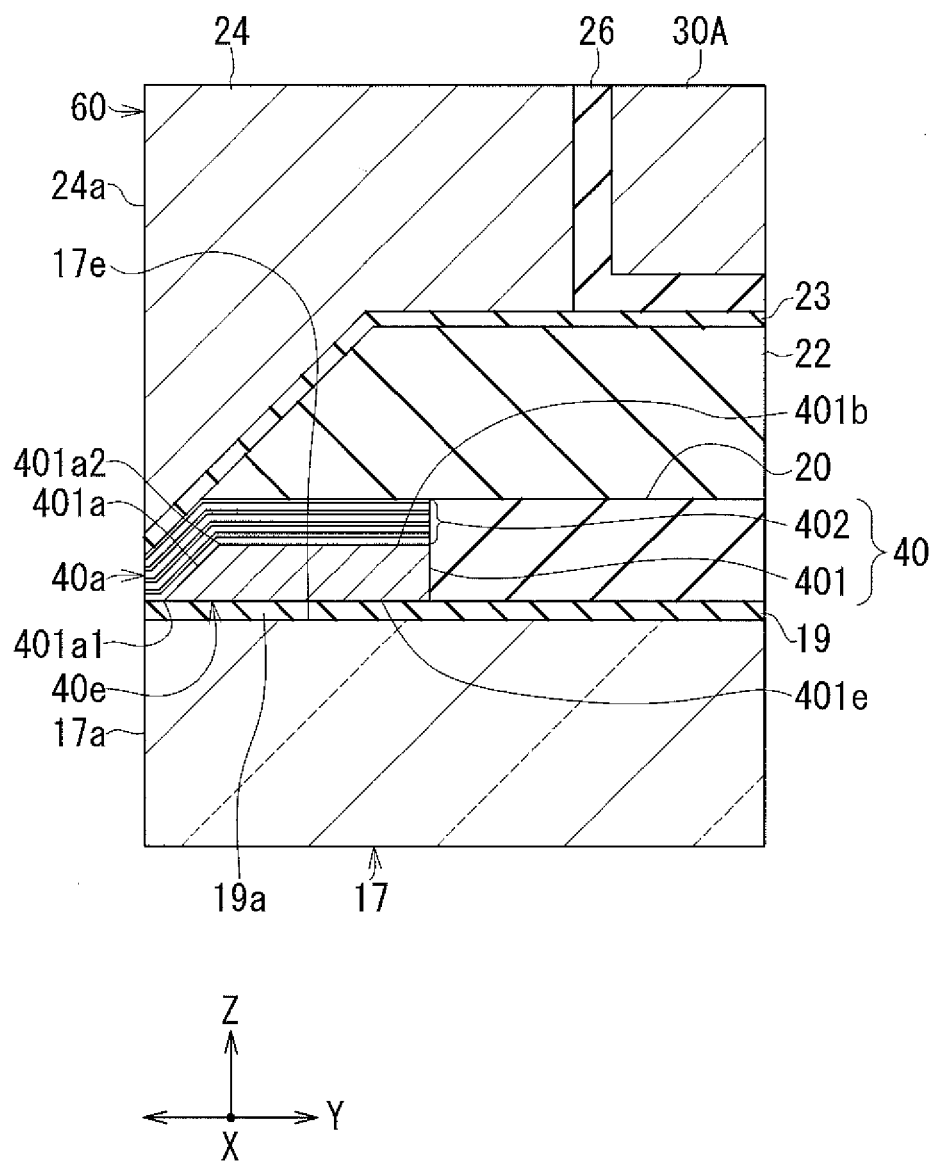
FIG. 2 is a cross-sectional view showing the main part of the thermally-assisted magnetic recording head according to the first embodiment of the invention.
Figure 3:
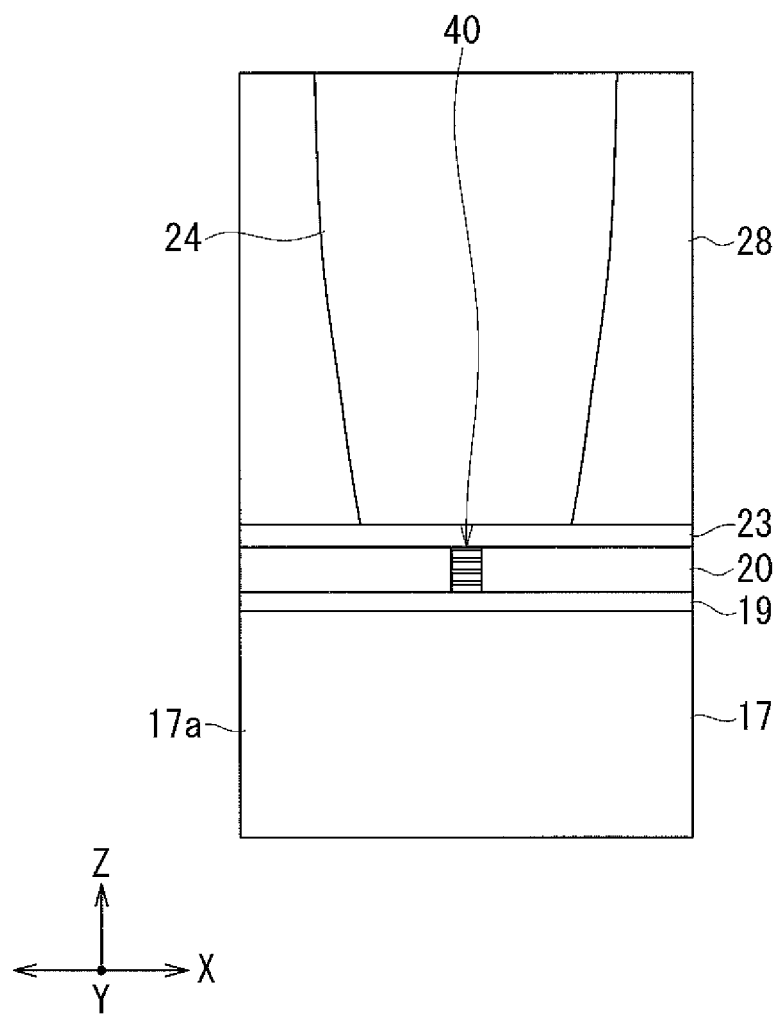
FIG. 3 is a front view showing part of the medium facing surface of the thermally-assisted magnetic recording head according to the first embodiment of the invention.
Figure 4:
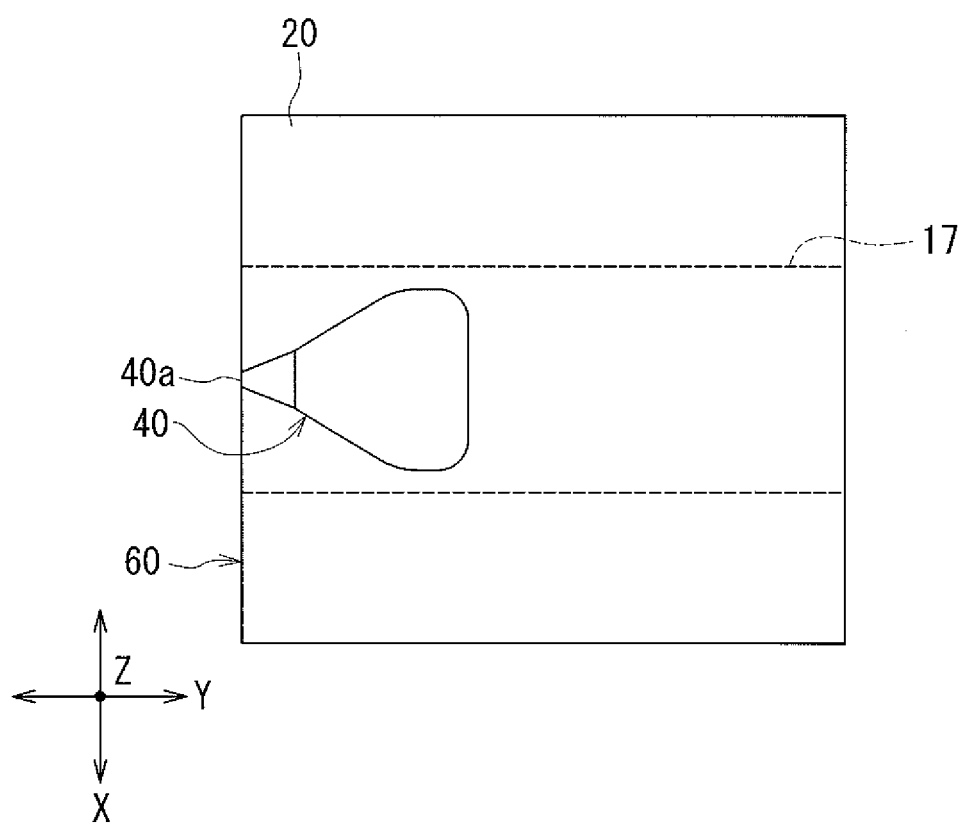
FIG. 4 is a plan view showing the positional relationship between the plasmon generator and the core of the waveguide shown in FIG. 1.

The core 17 and the plasmon generator 40 will now be described in detail with reference to FIG. 1 to FIG. 4. FIG. 1 is a perspective view showing the main part of the thermally-assisted magnetic recording head according to the present embodiment. FIG. 2 is a cross-sectional view showing the main part of the thermally-assisted magnetic recording head according to the present embodiment. FIG. 3 is a front view showing part of the medium facing surface 60 of the thermally-assisted magnetic recording head according to the present embodiment. FIG. 4 is a plan view showing the positional relationship between the plasmon generator 40 and the core 17 of the waveguide shown in FIG. 1.

The core 17 has an end face 17a closer to the medium facing surface 60, an evanescent light generating surface 17e or a top surface, a bottom surface 17c (see FIG. 5), and two side surfaces. The end face 17a may be located in the medium facing surface 60 or at a distance from the medium facing surface 60. FIG. 1 to FIG. 6 show an example in which the end face 17a is located in the medium facing surface 60.

The evanescent light generating surface 17e generates evanescent light based on the light propagating through the core 17. The cladding layer 19 covers the evanescent light generating surface 17e.

As shown in FIG. 1 and FIG. 2, the plasmon generator 40 has a front end face 40a and a core facing surface 40e. The front end face 40a is located in the medium facing surface 60. The front end face 40a generates near-field light on the principle to be described later. The core facing surface 40e faces the evanescent light generating surface 17e of the core 17.

The plasmon generator 40 is a multilayer plasmon generator including three or more layers. The plasmon generator 40 includes a metal portion 401 and a multilayer film portion 402. The metal portion 401 has a bottom surface 401e, a top surface 401b opposite to the bottom surface 401e, and an end face 401a facing toward the front end face 40a of the plasmon generator 40. The end face 401a may be inclined relative to the front end face 40a. FIG. 1 and FIG. 2 show an example in which the end face 401a is inclined relative to the front end face 40a. In this example, the end face 401a has a first edge 401a1 closest to the front end face 40a, and a second edge 401a2 farthest from the front end face 40a. The bottom surface 401e is connected to the end face 401a at the first edge 401a1. The top surface 401b is connected to the end face 401a at the second edge 401a2. The bottom surface 401e constitutes the principal part of the core facing surface 40e of the plasmon generator 40.

The first edge 401a1 may or may not be exposed in the front end face 40a. In the example shown in FIG. 1 and FIG. 2, the first edge 401a1 is not exposed in the front end face 40a, and no part of the metal portion 401 constitutes any part of the front end face 40a. The end face 401a forms an angle greater than 0° and equal to or smaller than 90° relative to a direction perpendicular to the front end face 40a. The angle preferably falls within the range of 15° to 90°, and more preferably within the range of 30° to 60°.

As shown in FIG. 1 and FIG. 2, the multilayer film portion 402 covers the end face 401a and at least part of the top surface 401b of the metal portion 401. In the example shown in FIG. 1 and FIG. 2, the multilayer film portion 402 covers the whole of the top surface 401b of the metal portion 401. Further, in this example, part of the multilayer film portion 402 is interposed between the first edge 401a1 and the front end face 40a and lies on the cladding layer 19.

As shown in FIG. 1, the multilayer film portion 402 includes at least a first metal layer M1, a second metal layer M2, and an intermediate layer N1. The intermediate layer N1 is interposed between the first metal layer M1 and the second metal layer M2. Each of the first metal layer M1, the second metal layer M2 and the intermediate layer N1 has an end face located in the front end face 40a. Each of the metal portion 401, the first metal layer M1 and the second metal layer M2 is formed of a metal material. The intermediate layer N1 is formed of a material that is higher in Vickers hardness than the metal material used to form the metal portion 401, the metal material used to form the first metal layer M1 and the metal material used to form the second metal layer M2.

The top surface of a part of the multilayer film portion 402 that lies on the end face 401a of the metal portion 401 is inclined relative to the front end face 40a, like the end face 401a. This top surface is contiguous with the end face of the dielectric layer 22 closest to the medium facing surface 60.

The plasmon generator 40 is configured so that surface plasmons are excited on the bottom surface 401e of the metal portion 401 through coupling with the evanescent light generated from the evanescent light generating surface 17e of the core 17, and the front end face 40a generates near-field light based on the surface plasmons.

The material used to form the intermediate layer N1 may be a metal material different from the metal material used to form the metal portion 401, the metal material used to form the first metal layer M1 and the metal material used to form the second metal layer M2, or may be a dielectric material. In the following, we discuss the case where the intermediate layer N1 is formed of a metal material different from the metal material used to form the metal portion 401, the metal material used to form the first metal layer M1 and the metal material used to form the second metal layer M2. Here, the metal material used to form the metal portion 401, the metal material used to form the first metal layer M1 and the metal material used to form the second metal layer M2 will each be referred to as a first-type metal material, and the metal material used to form the intermediate layer N1 will be referred to as a second-type metal material. The second-type metal material is higher in Vickers hardness than the first-type metal material. The first-type metal material is preferably higher in electrical conductivity than the second-type metal material.

In the example shown in FIG. 1, the first edge 401a1 of the end face 401a is located at a distance from the front end face 40a. The first metal layer M1 covers the top surface 401b and the end face 401a of the metal portion 401. A portion of the first metal layer M1 is interposed between the first edge 401a1 and the front end face 40a, and lies on the cladding layer 19. The bottom surface of this portion of the first metal layer M1 constitutes part of the core facing surface 40e of the plasmon generator 40. The intermediate layer N1 and the second metal layer M2 are stacked in this order on the first metal layer M1.

In the example shown in FIG. 1, the multilayer film portion 402 further includes a second intermediate layer N2, a third metal layer M3, a third intermediate layer N3, a fourth metal layer M4, and a protective layer N4 stacked in this order on the second metal layer M2. The metal layers M3 and M4 are each formed of the first-type metal material. The intermediate layers N2 and N3 and the protective layer N4 are each formed of the second-type metal material. As shown in FIG. 1 to FIG. 3, each of the metal layers M1 to M4, the intermediate layers N1 to N3 and the protective layer N4 has an end located in the front end face 40a. The protective layer N4 is provided for preventing diffusion of the material forming the metal layer M4. The protective layer N4 is not an essential component of the plasmon generator 40, and can be dispensed with.

The first-type metal material can be any of Au, Ag, Al and Cu, for example. The second-type metal material can be any of Ru, Pt, Pd, Zr, Ti, Ta, Ni, W, Cr, NiCr, Cu, TiW, TiN, Mo, Hf, Rb and Rh, for example. When the first-type metal material is Cu, the second-type metal material is other than Cu.

As far as the requirement that the second-type metal material be higher in Vickers hardness than the first-type metal material is satisfied, the materials used to form the metal portion 401 and the metal layers M1 to M4 may all be the same or may be different from each other, or some of them may be the same. Likewise, the materials used to form the intermediate layers N1 to N3 and the protective layer N4 may all be the same or may be different from each other, or some of them may be the same.

For example, the first metal layer M1, the intermediate layer N1, and the second metal layer M2 may be formed of Au, Ru, and Au, respectively, or of Au, Ru, and Cu, respectively.

The metal portion 401 is greater in thickness than the metal layers M1 to M4 and the intermediate layers N1 to N3. The intermediate layers N1 to N3 may be smaller in thickness than the metal layers M1 to M4. The thickness of the metal portion 401 falls within the range of, for example, 3 to 300 nm, and preferably within the range of 80 to 150 nm. The thickness of each of the metal layers M1 to M4 falls within the range of, for example, 0.5 to 50 nm, and preferably within the range of 0.8 to 30 nm. The thickness of each of the intermediate layers N1 to N3 and the protective layer N4 falls within the range of, for example, 0.2 to 20 nm, and preferably within the range of 0.3 to 1 nm.

As previously mentioned, the intermediate layer N1 may be formed of a dielectric material. Likewise, each of the intermediate layers N2 and N3 and the protective layer N4 may also be formed of a dielectric material. For example, each of the intermediate layers N1 to N3 and the protective layer N4 may be formed of any of the following dielectric materials: $SiO_2$; alumina; MgO; $ZrO_2$; $ZrN_2$; amorphous SiC; $Ta_2O_5$; and $Nb_2O_5$.

As shown in FIG. 2, the core facing surface 40e including the bottom surface 401e of the metal portion 401 faces the evanescent light generating surface 17e with a predetermined distance therebetween. The cladding layer 19 includes an interposition part 19a interposed between the evanescent light generating surface 17e and the core facing surface 40e including the bottom surface 401e of the metal portion 401. Since the cladding layer 19 is part of the cladding, the cladding can be said to include the interposition part 19a. The interposition part 19a has a thickness in the range of, for example, 10 to 100 nm, and preferably in the range of 15 to 50 nm.

As shown in FIG. 1 and FIG. 4, the plasmon generator 40 may include a portion whose width in the X direction decreases toward the front end face 40a.

Figure 7:
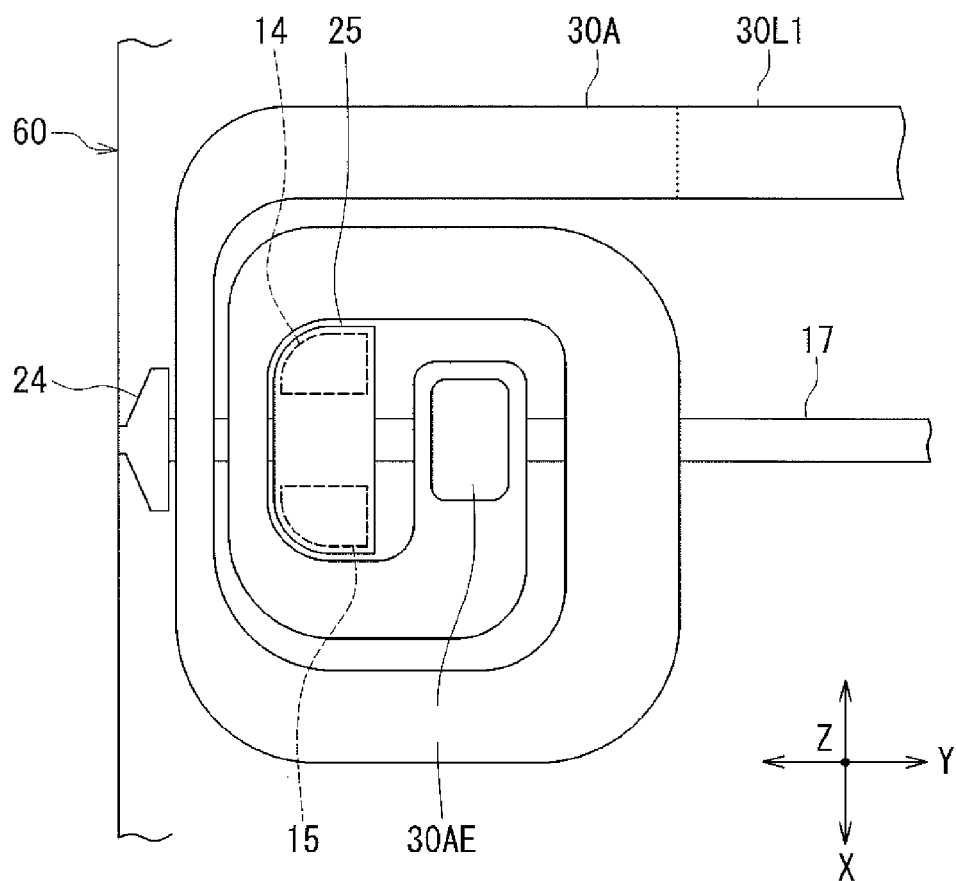
FIG. 7 is a plan view showing a first layer of a coil of the thermally-assisted magnetic recording head shown in FIG. 5.
Figure 8:
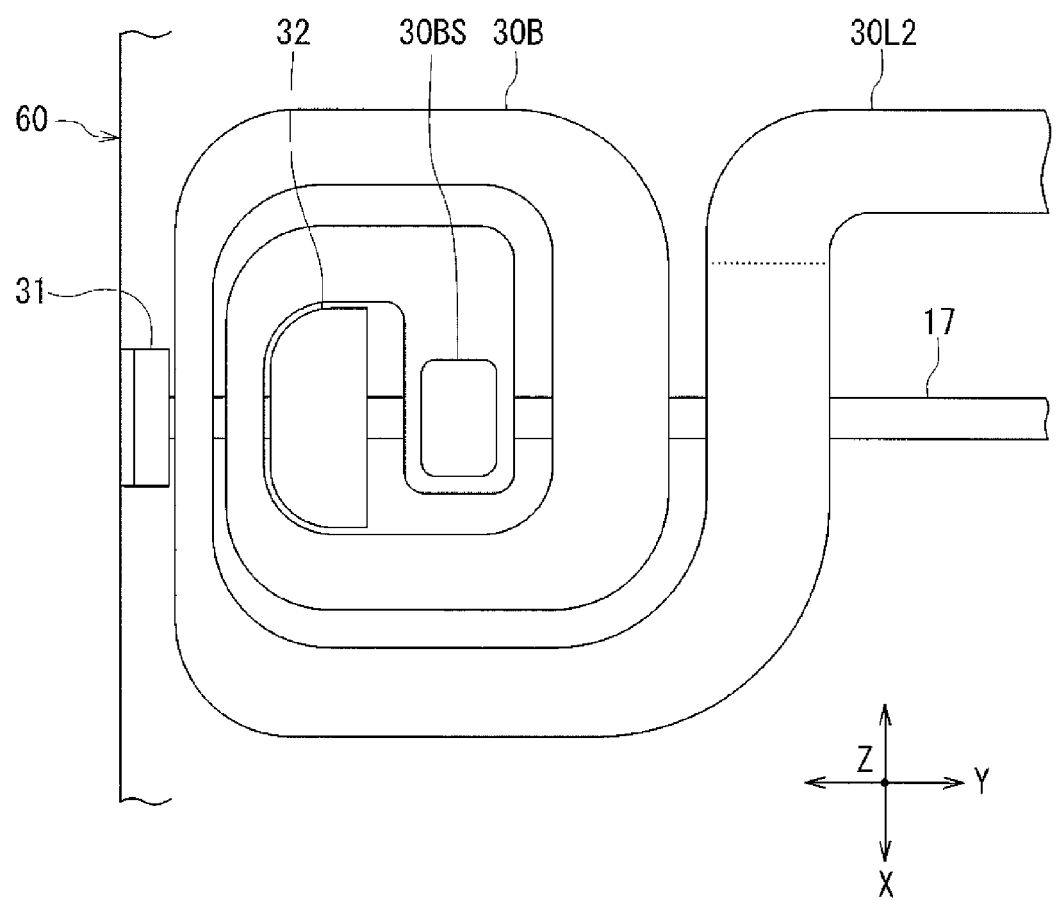
FIG. 8 is a plan view showing a second layer of the coil of the thermally-assisted magnetic recording head shown in FIG. 5.

The coil 30 will now be described in detail with reference to FIG. 7 and FIG. 8. FIG. 7 is a plan view showing the first layer 30A of the coil 30. FIG. 8 is a plan view showing the second layer 30B of the coil 30. As shown in FIG. 7, the first layer 30A is wound approximately two turns around the coupling layer 25. In FIG. 7, the first and second coupling portions 14 and 15 connected to the coupling layer 25 are shown by broken lines. The coil 30 includes a lead portion 30L1 connected to one end of the first layer 30A. In FIG. 7 the boundary between the lead portion 30L1 and the first layer 30A is indicated by a dotted line. The first layer 30A has a coil connection 30AE provided near the other end of the first layer 30A. The first layer 30A is wound in a counterclockwise direction from the boundary between the lead portion 30L1 and the first layer 30A to the coil connection 30AE.

As shown in FIG. 8, the second layer 30B is wound approximately two turns around the coupling layer 32. The coil 30 includes a lead portion 30L2 connected to one end of the second layer 30B. In FIG. 8 the boundary between the lead portion 30L2 and the second layer 30B is indicated by a dotted line. The second layer 30B has a coil connection 30BS provided near the other end of the second layer 30B. The second layer 30B is wound in a counterclockwise direction from the coil connection 30BS to the boundary between the lead portion 30L2 and the second layer 30B. The coil connection 30BS penetrates the insulating layer 33 and is electrically connected to the coil connection 30AE.

Now, the principle of generation of near-field light in the present embodiment and the principle of thermally-assisted magnetic recording using near-field light will be described in detail. Laser light emitted from a laser diode (not illustrated) enters the core 17. As shown in FIG. 5, the laser light 50 propagates through the core 17 toward the medium facing surface 60, and reaches the vicinity of the plasmon generator 40. In the core 17, the laser light 50 is totally reflected at the evanescent light generating surface 17e shown in FIG. 2 to generate evanescent light permeating into the interposition part 19a. In the plasmon generator 40, surface plasmons are excited on the core facing surface 40e through coupling with the evanescent light. The bottom surface 401e of the metal portion 401 constitutes the principal part of the core facing surface 40e. Thus, it is mainly on the bottom surface 401e of the metal portion 401, a part of the core facing surface 40e, that the surface plasmons are excited through coupling with the evanescent light.

The surface plasmons excited mainly on the bottom surface 401e of the metal portion 401 pass through the bottom surface of the first metal layer M1 lying between the first edge 401a1 and the front end face 40a, and propagate to the front end face 40a. The surface plasmons concentrate at the front end face 40a, and the front end face 40a generates near-field light based on the surface plasmons.

The surface plasmons excited mainly on the bottom surface 401e of the metal portion 401 propagate to at least the end of the first metal layer M1 located in the front end face 40a. Where each of the intermediate layers N1 to N3 is formed of a metal material, the surface plasmons having propagated to the end of the first metal layer M1 can also propagate to the respective ends of the metal layers M2 to M4 and the intermediate layers N1 to N3 located in the front end face 40a. To allow the front end face 40a to generate near-field light of sufficient intensity, the surface plasmons having propagated to the end of the first metal layer M1 preferably propagate to at least the end of the second metal layer M2.

Where each of the intermediate layers N1 to N3 is formed of a dielectric material, surface plasmons can be excited also on the surfaces of the metal layers M2 to M4 in the following manner. The thicknesses of the intermediate layers N1 to N3 are sufficiently smaller than the wavelength of light propagating through the core 17. Accordingly, where each of the intermediate layers N1 to N3 is formed of a dielectric material, a transfer of energy occurs between the metal layers M1 and M2 which are adjacent to each other with the intermediate layer N1 interposed therebetween, between the metal layers M2 and M3 which are adjacent to each other with the intermediate layer N2 interposed therebetween, and between the metal layers M3 and M4 which are adjacent to each other with the intermediate layer N3 interposed therebetween. As a result, surface plasmons can be excited also on the surfaces of the metal layers M2 to M4. However, the energy of the surface plasmons excited on the surfaces of the metal layers M2 to M4 is lower than the energy of the surface plasmons excited on the bottom surface 401e of the metal portion 401.

The near-field light generated from the front end face 40a is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 24 for data writing.

A method of manufacturing the thermally-assisted magnetic recording head according to the present embodiment will now be described. The method of manufacturing the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including rows of a plurality pre-head portions, the plurality of pre-head portions becoming individual thermally-assisted magnetic recording heads later; and cutting the substructure to separate the plurality of pre-head portions from each other and forming the medium facing surface 60 for each of the plurality of pre-head portions (this step will be referred to as the step of forming the medium facing surface 60). A plurality of thermally-assisted magnetic recording heads are produced in this manner.

The method of manufacturing the thermally-assisted magnetic recording head according to the present embodiment will now be described in more detail with attention focused on a single thermally-assisted magnetic recording head. The method of manufacturing the thermally-assisted magnetic recording head forms the insulating layer 2, the bottom shield layer 3, and the bottom shield gap film 4 in this order on the substrate 1 first. Next, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Then, the yoke layer 11 is formed on the nonmagnetic layer 10. Next, the insulating layer 12 is formed to cover the yoke layer 11. The insulating layer 12 is then polished by, for example, chemical mechanical polishing (hereinafter referred to as CMP), until the yoke layer 11 is exposed. Next, the shield layer 13 and the first layers of the coupling portions 14 and 15 are formed on the yoke layer 11. Next, the cladding layer 16 is formed to cover the shield layer 13 and the first layers of the coupling portions 14 and 15. The cladding layer 16 is then polished by, for example, CMP, until the first layers of the coupling portions 14 and 15 are exposed.

Next, the core 17 is formed on the cladding layer 16. Then, the second layers of the coupling portions 14 and 15 are formed on the first layers of the coupling portions 14 and 15, respectively. Next, the cladding layer 18 is formed over the entire top surface of the stack. The cladding layer 18 is then polished by, for example, CMP, until the core 17 and the second layers of the coupling portions 14 and 15 are exposed.

Reference is now made to FIG. 9A through FIG. 17B to describe steps to be performed after the polishing of the cladding layer 18 up to the formation of the main pole 24. The following descriptions include the description of a method of manufacturing the plasmon generator 40 according to the present embodiment. FIG. 9A through FIG. 17B each show a stack of layers formed in the process of manufacturing the thermally-assisted magnetic recording head. Note that portions located below the core 17 are omitted from FIG. 9A through FIG. 17B. FIGS. 9A-17A each show a cross section that intersects the end face 24a of the main pole 24 and that is perpendicular to the medium facing surface 60 and the top surface 1a of the substrate 1. FIGS. 9B-17B each show a cross section of the stack taken at the position at which the medium facing surface 60 is to be formed. In FIGS. 9A-17A, the symbol "ABS" indicates the position at which the medium facing surface 60 is to be formed.

Figure 9A:
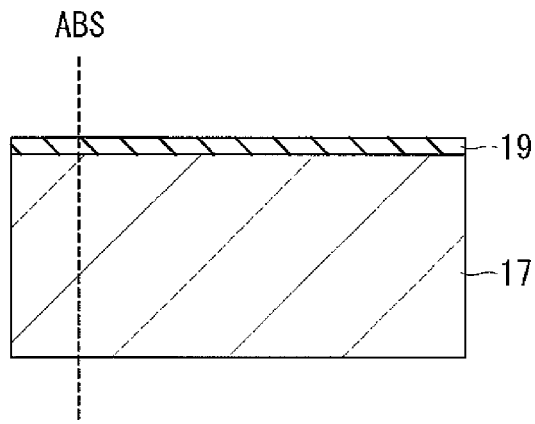
FIG. 9A and FIG. 9B are cross-sectional views showing a step of a method of manufacturing the thermally-assisted magnetic recording head according to the first embodiment of the invention.
Figure 9B:
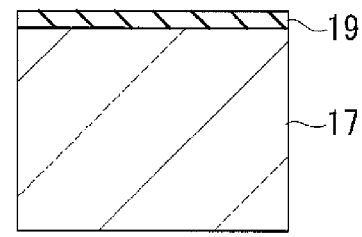

FIG. 9A and FIG. 9B show a step that follows the polishing of the cladding layer 18. In this step, the cladding layer 19 is formed over the core 17 and the cladding layer 18.

Figure 10A:
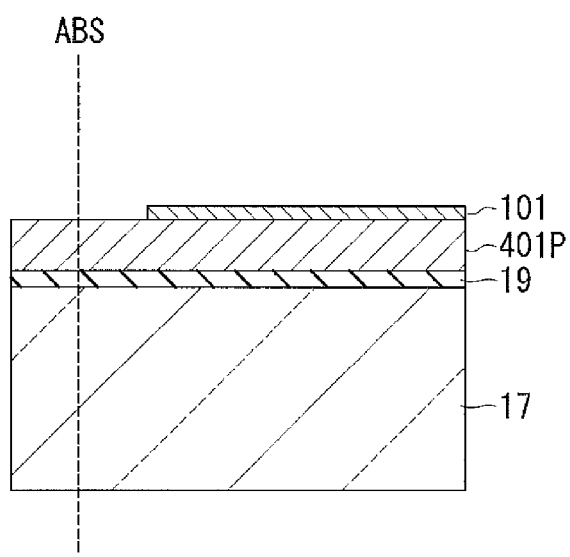
FIG. 10A and FIG. 10B are cross-sectional views showing a step that follows the step shown in FIG. 9A and FIG. 9B.
Figure 10B:
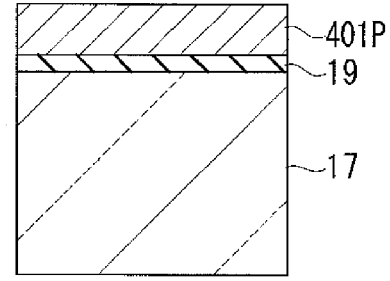

FIG. 10A and FIG. 10B show the next step. In this step, first, a metal film 401P, which later becomes the metal portion 401, is formed on the cladding layer 19 by sputtering, for example. Next, a first mask layer 101 is formed on the metal film 401P by sputtering, for example. The first mask layer 101 is formed of Ta or alumina, for example. Then, a second mask layer 102 patterned is formed on the first mask layer 101. For example, the second mask layer 102 is formed by patterning a layer of a photoresist by photolithography. A portion of the first mask layer 101 is then etched by, for example, ion beam etching (hereinafter referred to as IBE), using the second mask layer 102 as a mask. The second mask layer 102 is then removed.

FIG. 11A and FIG. 11B show the next step. In this step, the metal film 401P is taper-etched by, for example, IBE, using the first mask layer 101 as a mask. The taper-etched metal film 401P forms an initial metal portion 401Q which later becomes the metal portion 401. The initial metal portion 401Q has an initial top surface 401Qb which later becomes the top surface 401b of the metal portion 401, and an initial end face 401Qa which later becomes the end face 401a of the metal portion 401. The initial end face 401Qa is the surface formed by the aforementioned taper-etching. Then, the first mask layer 101 is removed.

FIG. 12A and FIG. 12B show the next step. In this step, a multilayer film 402P, which later becomes the multilayer film portion 402, is formed by, for example, sputtering, so as to cover at least part of the initial metal portion 401Q. In the present embodiment, the multilayer film 402P is formed on the initial top surface 401Qb and the initial end face 401Qa of the initial metal portion 401Q and on the cladding layer 19, in particular.

FIG. 13A and FIG. 13B show the next step. In this step, first, an etching mask 103 is formed on the multilayer film 402P. The etching mask 103 is formed by patterning a layer of a photoresist by photolithography, for example. The planar shape (the shape in a plan view) of the etching mask 103 corresponds to the planar shape of the plasmon generator 40. Then, portions of the initial metal portion 401Q and the multilayer film 402P are etched by, for example, IBE or reactive ion etching (hereinafter referred to as RIE) using the etching mask 103, whereby the initial metal portion 401Q and the multilayer film 402P are patterned. The initial metal portion 401Q is patterned into the metal portion 401. Patterning the initial metal portion 401Q makes the initial top surface 401Qb into the top surface 401b of the metal portion 401, and the initial end face 401Qa into the end face 401a of the metal portion 401. The multilayer film 402P is patterned into the multilayer film portion 402.

Next, as shown in FIG. 14A and FIG. 14B, the etching mask 103 is removed.

Figures 15A, 15B:
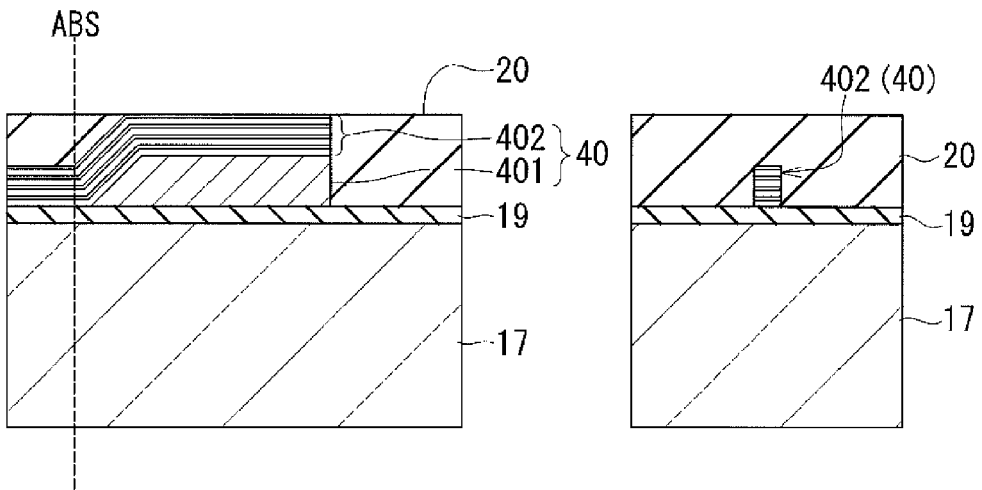
FIG. 15A and FIG. 15B are cross-sectional views showing a step that follows the step shown in FIG. 14A and FIG. 14B.

FIG. 15A and FIG. 15B show the next step. In this step, first, the dielectric layer 20 is formed over the entire top surface of the stack. The dielectric layer 20 is then polished by, for example, CMP, until a part of the multilayer film portion 402 that lies on the metal portion 401 is exposed.

Figures 16A, 16B:
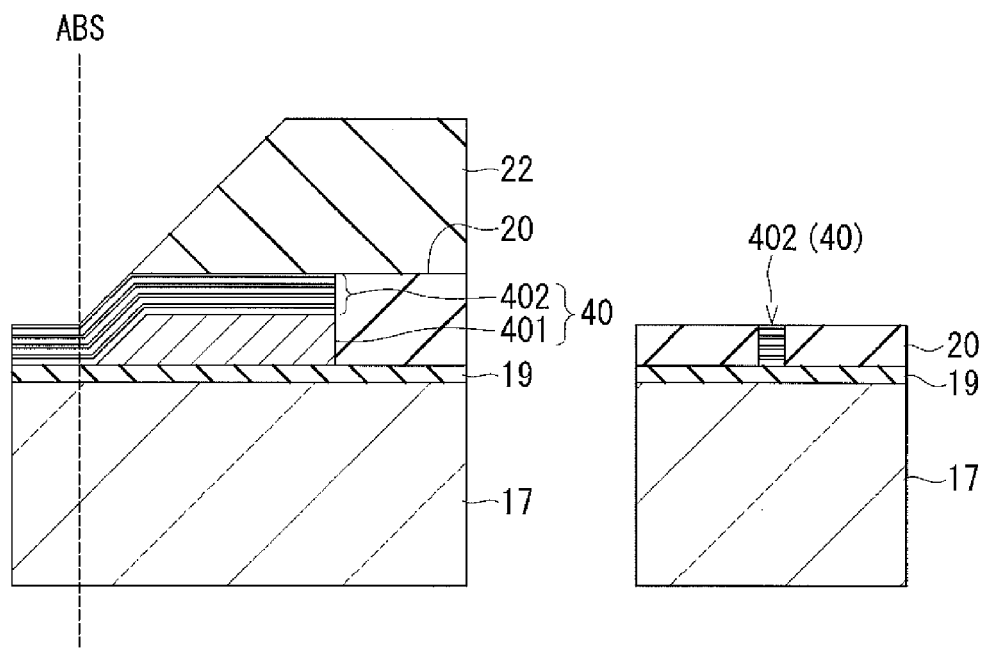
FIG. 16A and FIG. 16B are cross-sectional views showing a step that follows the step shown in FIG. 15A and FIG. 15B.

FIG. 16A and FIG. 16B show the next step. In this step, first, the dielectric layer 22 is formed over the multilayer film portion 402 and the dielectric layer 20. An etching mask (not illustrated) is then formed on the dielectric layer 22. Using this etching mask, the dielectric layers 22 and 20 are then taper-etched by IBE, for example. This forms the end face of the dielectric layer 22 closest to the medium facing surface 60 and removes a part of the dielectric layer 20 lying on the multilayer film portion 402.

Figures 17A, 17B:
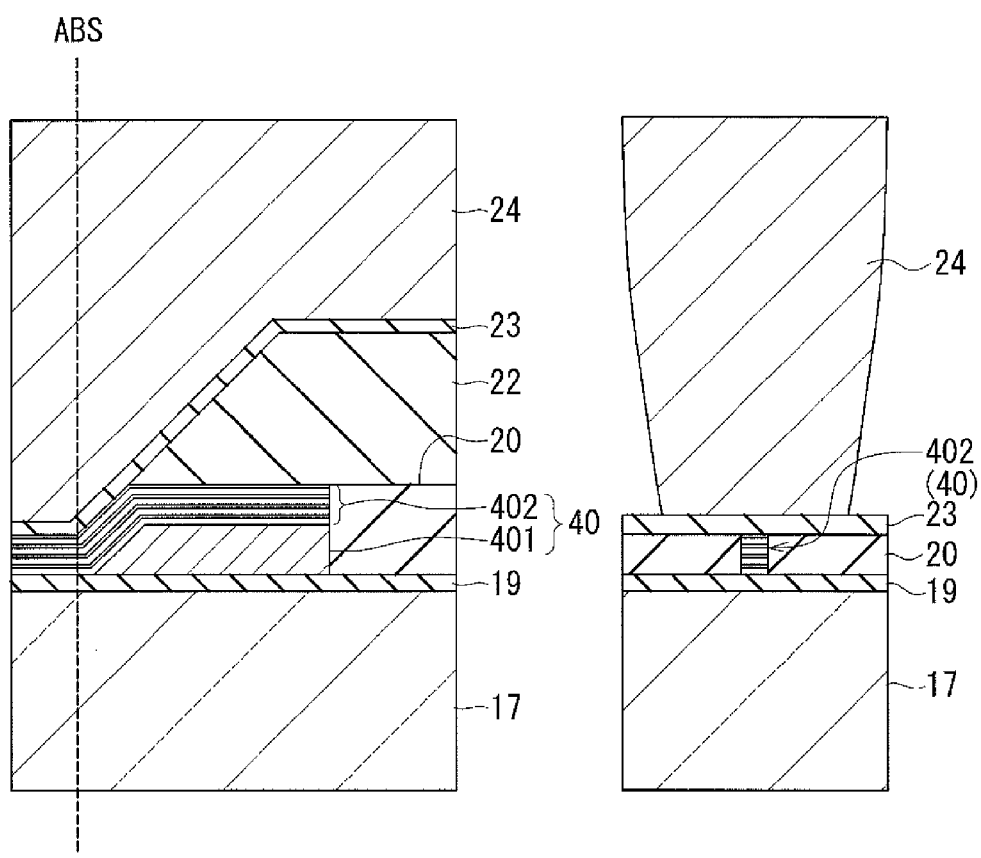
FIG. 17A and FIG. 17B are cross-sectional views showing a step that follows the step shown in FIG. 16A and FIG. 16B.

FIG. 17A and FIG. 17B show the next step. In this step, first, the dielectric layer 23 is formed to cover the multilayer film portion 402 and the dielectric layers 20 and 22. Then, the cladding layer 19 and the dielectric layers 20, 22 and 23 are selectively etched to form therein two openings for exposing the respective top surfaces of the second layers of the coupling portions 14 and 15. Next, the third layers of the coupling portions 14 and 15 are formed on the second layers of the coupling portions 14 and 15, respectively. Then, the main pole 24 is formed on the dielectric layer 23, and the coupling layer 25 is formed on the third layers of the coupling portions 14 and 15 and the dielectric layer 23.

A series of steps from the step shown in FIG. 10A and FIG. 10B to the step shown in FIG. 16A and FIG. 16B corresponds to the method of manufacturing the plasmon generator 40 according to the present embodiment.

Now, steps to follow the step of FIG. 17A and FIG. 17B will be described with reference to FIG. 5 and FIG. 6. First, the insulating layer 26 is formed. Then, the first layer 30A of the coil 30 is formed on the insulating layer 26. The insulating layer 27 is then formed. Next, the insulating layer 28 is formed over the entire top surface of the stack. The insulating layer 28 is then polished by, for example, CMP, until the main pole 24, the coupling layer 25 and the first layer 30A are exposed. The top surfaces of the main pole 24, the coupling layer 25 and the insulating layer 28 are thereby planarized.

Next, the coupling layer 31 is formed on the main pole 24 and the coupling layer 32 is formed on the coupling layer 25. The insulating layer 33 is then formed. Then, an opening for exposing the coil connection 30AE of the first layer 30A is formed in the insulating layer 33. The second layer 30B of the coil 30 is then formed on the insulating layer 33. The coil connection S0BS of the second layer 30B is disposed on the coil connection 30AE. Next, the insulating layers 34 and 35 and the coupling layer 36 are formed in succession. Then, the coupling layers 31 and 36 are taper-etched to provide the coupling layers 31 and 36 with the respective end faces facing toward the medium facing surface 60. Next, the insulating layer 37 is formed over the entire top surface of the stack. The insulating layer 37 is then polished by, for example, CMP, until the coupling layer 36 is exposed. Then, the protective layer 38 is formed to cover the entire top surface of the stack.

Wiring, terminals, and other components are then formed on the top surface of the protective layer 38. When the substructure is completed thus, the step of forming the medium facing surface 60 is performed. Forming the medium facing surface 60 provides the multilayer film portion 402 with the front end face 40a. A protective film for covering the medium facing surface 60 may be formed thereafter. Being provided with the medium facing surface 60, each pre-head portion becomes a thermally-assisted magnetic recording head.

The step of forming the medium facing surface 60 includes the step of polishing the surface that is formed for each pre-head portion by cutting the substructure, and the step of forming a rail on the polished surface for allowing the slider to fly.

In the aforementioned polishing step, the layers exposed in the medium facing surface 60 may be polished in different amounts due to differences between materials used for those layers, and this may cause irregularities on the medium facing surface 60.

Further, in the aforementioned polishing step, polishing residues of the metal materials may grow to cause smears. In order to remove the smears, the step of forming the medium facing surface 60 may include the step of etching the polished surface slightly by, for example, IBE, after the polishing step.

The effects of the plasmon generator 40 and the thermally-assisted magnetic recording head according to the present embodiment will now be described. The plasmon generator 40 according to the present embodiment includes the metal portion 401 and the multilayer film portion 402. The multilayer film portion 402 includes at least the first metal layer M1, the second metal layer M2 and the intermediate layer N1. Each of the first metal layer M1, the second metal layer M2 and the intermediate layer N1 has an end located in the front end face 40a of the plasmon generator 40. The intermediate layer N1 is interposed between the first metal layer M1 and the second metal layer M2. The intermediate layer N1 is formed of a material that is higher in Vickers hardness than the metal material used to form the first metal layer M1 and the metal material used to form the second metal layer M2. This makes it possible to prevent the first metal layer M1 and the second metal layer M2 sandwiching the intermediate layer N1 from being deformed. Further, the plasmon generator 40 according to the present embodiment achieves higher mechanical strength as a whole when compared with a plasmon generator that is formed only of a single metal layer of the first-type metal material.

The foregoing features of the plasmon generator 40 according to the present embodiment make it possible to prevent the plasmon generator 40 from being deformed or damaged, and the front end face 40a from being significantly recessed relative to the other parts of the medium facing surface 60 in the step of forming the medium facing surface 60 or due to a temperature change of the plasmon generator 40. Consequently, the present embodiment allows for preventing the plasmon generator 40 from being degraded in heating performance. This benefit is more noticeable when the multilayer film portion 402 includes one or more pairs of an intermediate layer and a metal layer in addition to the first metal layer M1, the second metal layer M2 and the intermediate layer N1.

Further, in the plasmon generator 40 according to the present embodiment, the metal portion 401 has the bottom surface 401e on which surface plasmons are to be excited, the top surface 401b, and the end face 401a. The multilayer film portion 402 covers the top surface 401b and the end face 401a of the metal portion 401. The metal portion 401 is greater in thickness than the metal layers M1 to M4 and the intermediate layers N1 to N3 of the multilayer film portion 402. Such a configuration allows for sufficient excitation of surface plasmons on the thick metal portion 401.

Further, in the present embodiment, there is no difference in level between the bottom surface 401e of the metal portion 401 and the bottom surface of the part of the multilayer film portion 402 that is interposed between the first edge 401a1 and the front end face 40a and lies on the cladding layer 19. The present embodiment thus allows the surface plasmons excited on the bottom surface 401e to efficiently propagate to the front end face 40a composed of the respective ends of the layers included in the multilayer film portion 402.

In the present embodiment, in particular, the end face 401a of the metal portion 401 is inclined relative to the front end face 40a so that the first edge 401a1 is located closer to the front end face 40a than is the second edge 401a2. The present embodiment thus makes it possible to bring the edge of the bottom surface 401e of the metal portion 401 closest to the front end face 40a, that is, the first edge 401a1 of the end face 401a, into close proximity to the front end face 40a while configuring the respective ends of the layers included in the multilayer film portion 402 to constitute the front end face 40a. This allows the surface plasmons excited on the bottom surface 401e to propagate to the front end face 40a more efficiently.

Further, in the present embodiment, no part of the metal portion 401 constitutes any part of the front end face 40a. Accordingly, the material for the metal portion 401 can be selected from any metal materials that have high electrical conductivities and are suitable for excitation and propagation of surface plasmons, without the need for considering mechanical strength. This allows for appropriate excitation and propagation of surface plasmons on the metal portion 401.

As can be seen from the foregoing, the present embodiment makes it possible to provide the plasmon generator 40 having high reliability and allowing surface plasmons to propagate to the front end face 40a efficiently, and to provide a thermally-assisted magnetic recording head having the plasmon generator 40.

Further, the plasmon generator 40 according to the present embodiment provides additional effects as described below when configured so that a metal layer in the multilayer film portion 402 is sandwiched between two intermediate layers. A metal layer is typically formed of a metal polycrystal. In general, when a metal polycrystal gets hot, a plurality of crystal grains constituting the metal polycrystal aggregate and grow, and can thereby cause the metal polycrystal to be deformed. If a metal layer is sandwiched between two intermediate layers, the metal layer is restrained to some extent by the two intermediate layers. In such a case, it is thus possible to prevent the aggregation and growth of the plurality of crystal grains constituting the metal layer (the metal polycrystal) when the metal layer gets hot. This consequently allows for preventing the metal layer from becoming deformed.

Where the first-type metal material is higher in electrical conductivity than the second-type metal material, the intermediate layers N1 to N3 are preferably smaller in thickness than the metal layers M1 to M4. In such a case, it is possible to reduce loss of surface plasmons when the surface plasmons propagate from the end of the metal layer M1 located in the front end face 40a to the respective ends of the metal layers M2 to M4 located in the front end face 40a.

Second Embodiment

A second embodiment of the invention will now be described. The thermally-assisted magnetic recording head and the plasmon generator 40 according to the present embodiment are the same in configuration as those according to the first embodiment. The present embodiment differs from the first embodiment in the method of manufacturing the thermally-assisted magnetic recording head, particularly in the method of manufacturing the plasmon generator 40.

The method of manufacturing the thermally-assisted magnetic recording head and the method of manufacturing the plasmon generator 40 according to the present embodiment will now be described with reference to FIG. 18A through FIG. 21B. FIG. 18A through FIG. 21B each show a stack of layers formed in the process of manufacturing the thermally-assisted magnetic recording head. Note that portions located below the core 17 are omitted from FIG. 18A through FIG. 21B. FIGS. 18A-21A each show a cross section that intersects the end face 24a of the main pole 24 and that is perpendicular to the medium facing surface 60 and the top surface 1a of the substrate 1. FIGS. 18B-21B each show a cross section of the stack taken at the position at which the medium facing surface 60 is to be formed. In FIGS. 18A-21A, the symbol "ABS" indicates the position at which the medium facing surface 60 is to be formed.

The method of manufacturing the thermally-assisted magnetic recording head and the method of manufacturing the plasmon generator 40 according to the present embodiment are the same as those according to the first embodiment up to the step shown in FIG. 12A and FIG. 12B.

FIG. 18A and FIG. 18B show a step to follow the step of FIG. 12A and FIG. 12B. In this step, a metal film 110 having a thickness equal to or greater than that of the initial metal portion 401Q is formed on the multilayer film 402P. The metal film 110 is formed of a metal material. The metal material used to form the metal film 110 is preferably the same as the metal material used to form the initial metal portion 401Q (the metal portion 401).

FIG. 19A and FIG. 19B show the next step. In this step, first, the metal film 110 is polished by, for example, CMP, until a part of the multilayer film 402P that lies on the initial metal portion 401Q is exposed. The top surfaces of the metal film 110 and the multilayer film 402P are thereby planarized. Next, an etching mask 113 is formed over the top surfaces of the metal film 110 and the multilayer film 402P. The etching mask 113 is formed by patterning a layer of a photoresist by photolithography, for example. The planar shape of the etching mask 113 corresponds to the planar shape of the plasmon generator 40. Next, portions of the initial metal portion 401Q, the multilayer film 402P and the metal film 110 are etched by, for example, IBE or RIE using the etching mask 113, whereby the initial metal portion 401Q, the multilayer film 402P and the metal film 110 are patterned. The initial metal portion 401Q is patterned into the metal portion 401. The multilayer film 402P is patterned into the multilayer film portion 402. After this step, the metal film 110 remains on a part of the multilayer film portion 402 that lies on the end face 401a of the metal portion 401 and the cladding layer 19.

Figures 20A, 20B:
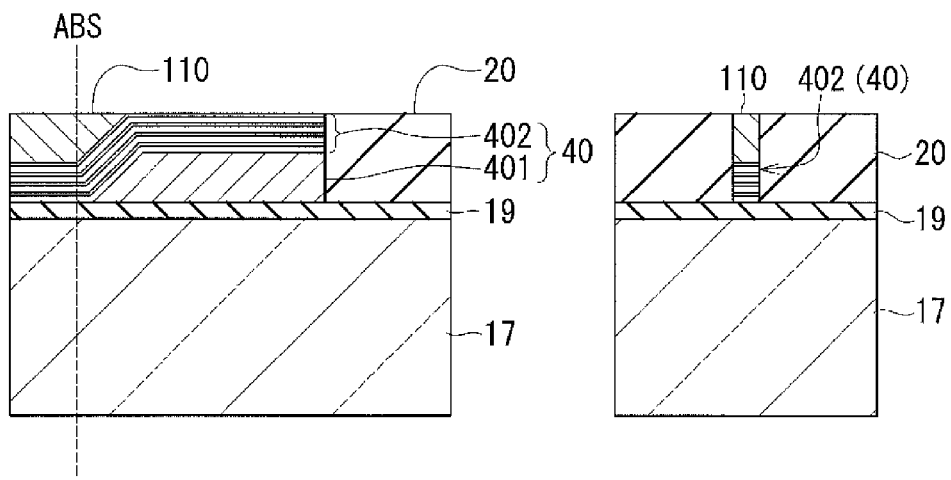
FIG. 20A and FIG. 20B are cross-sectional views showing a step that follows the step shown in FIG. 19A and FIG. 19B.

FIG. 20A and FIG. 20B show the next step. In this step, first, the etching mask 113 is removed. Next, the dielectric layer 20 is formed over the entire top surface of the stack. The dielectric layer 20 is then polished by, for example, CMP, until the part of the multilayer film portion 402 lying on the metal portion 401 is exposed.

Figures 21A, 21B:
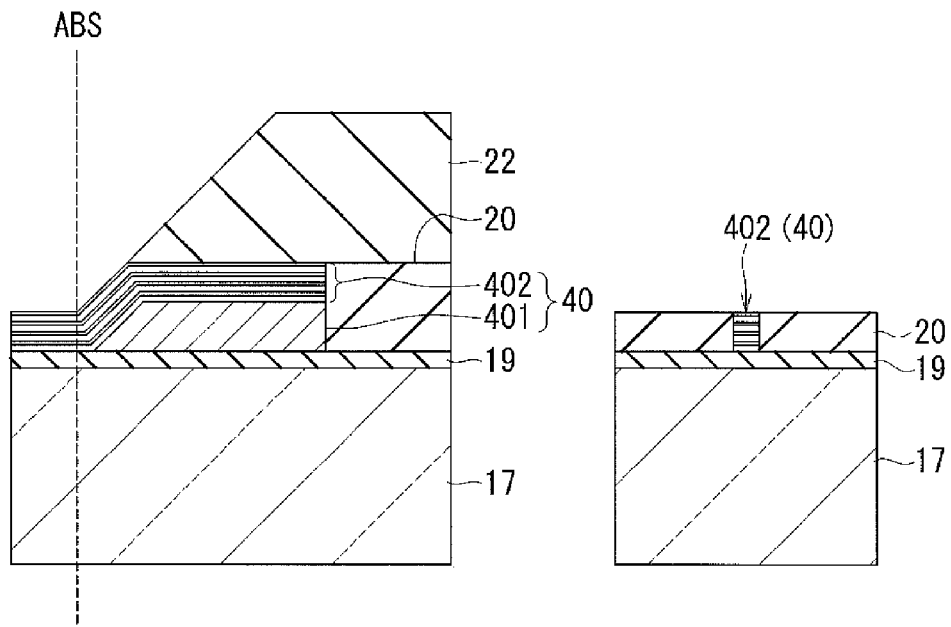
FIG. 21A and FIG. 21B are cross-sectional views showing a step that follows the step shown in FIG. 20A and FIG. 20B.

FIG. 21A and FIG. 21B show the next step. In this step, the dielectric layer 22 is formed over the multilayer film portion 402 and the dielectric layer 20 in the same manner as the step shown in FIG. 16A and FIG. 16B. Next, an etching mask (not illustrated) is formed on the dielectric layer 22. Then, using this etching mask, the dielectric layers 22 and 20 are taper-etched and at least part of the metal film 110 is removed by IBE, for example. This forms the end face of the dielectric layer 22 closest to the medium facing surface 60. In the present embodiment, in particular, the whole of the metal film 110 is removed in this step.

A series of steps subsequent to the above-described step in the present embodiment is the same as a series of steps subsequent to the step of FIG. 16A and FIG. 16B in the first embodiment.

In the method of manufacturing the plasmon generator 40 according to the present embodiment, prior to patterning the initial metal portion 401Q and the multilayer film 402P, the metal film 110 is formed and the top surfaces of the metal film 110 and the multilayer film 402P are planarized. Thereafter, the initial metal portion 401Q, the multilayer film 402P and the metal film 110 are patterned by etching portions of the initial metal portion 401Q, the multilayer film 402P and the metal film 110. Accordingly, in the present embodiment, when etching the portions of the initial metal portion 401Q, the multilayer film 402P and the metal film 110, the structure to be etched is uniform in thickness regardless of position. Further, in this structure, materials and the amount to be etched do not substantially vary from position to position. The present embodiment thus allows for preventing the etching amount from varying from position to position when the portions of the initial metal portion 401Q, the multilayer film 402P and the metal film 110 are etched. Consequently, the present embodiment allows for accurately patterning the initial metal portion 401Q and the multilayer film 402P.

The remainder of configuration, function and effects of the present embodiment are similar to those of the first embodiment.

Third Embodiment

Figure 22:
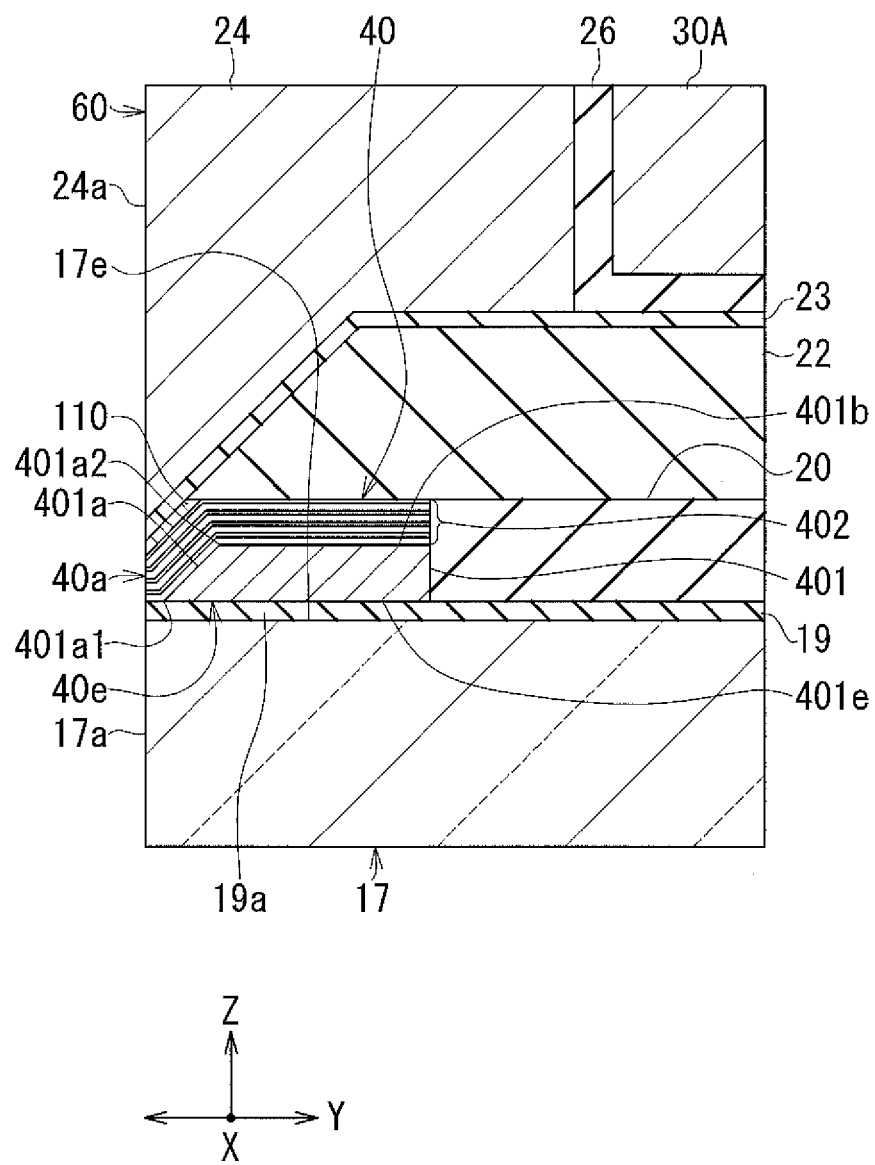
FIG. 22 is a cross-sectional view showing the main part of a thermally-assisted magnetic recording head according to a third embodiment of the invention.
Figure 23:
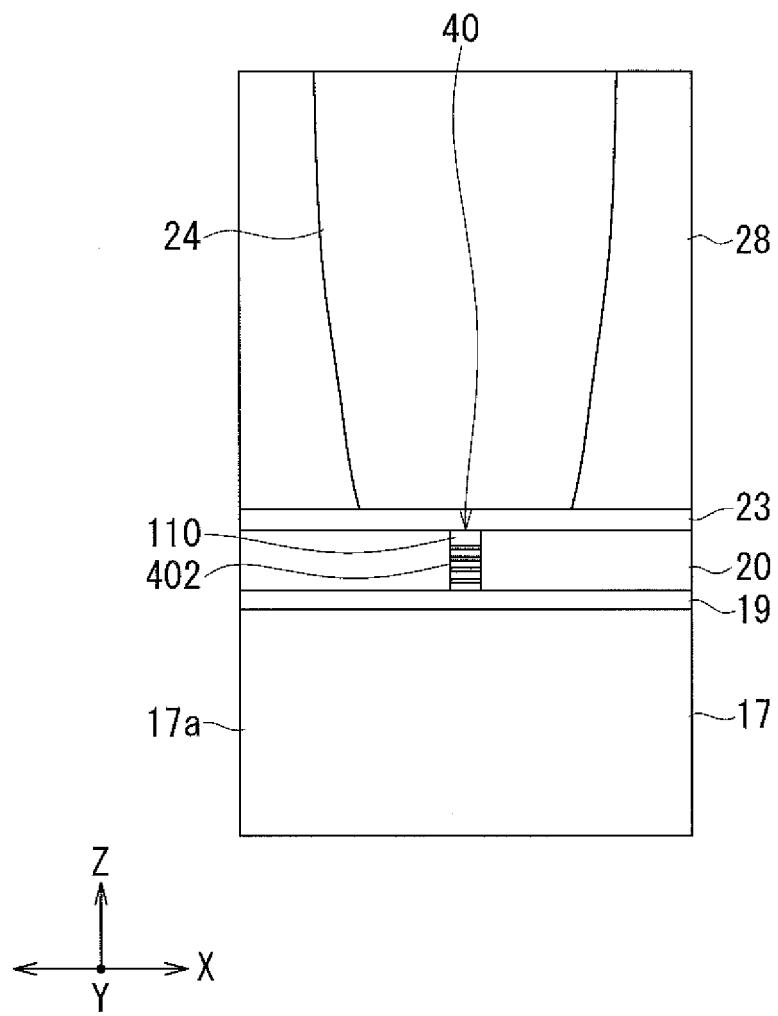
FIG. 23 is a front view showing part of the medium facing surface of the thermally-assisted magnetic recording head according to the third embodiment of the invention.

A third embodiment of the invention will now be described. First, the configurations of the thermally-assisted magnetic recording head and the plasmon generator 40 according to the present embodiment will be described with reference to FIG. 22 and FIG. 23. FIG. 22 is a cross-sectional view showing the main part of the thermally-assisted magnetic recording head according to the present embodiment. FIG. 23 is a front view showing part of the medium facing surface 60 of the thermally-assisted magnetic recording head according to the present embodiment.

In the present embodiment, as shown in FIG. 22 and FIG. 23, the plasmon generator 40 includes a metal film 110 in addition to the metal portion 401 and the multilayer film portion 402. The metal film 110 is formed of a metal material and stacked on the multilayer film portion 402. The metal film 110 is stacked particularly on the part of the multilayer film portion 402 lying on the end face 401a of the metal portion 401 and the cladding layer 19. The metal film 110 has an end located in the front end face 40a.

Figure 24A:
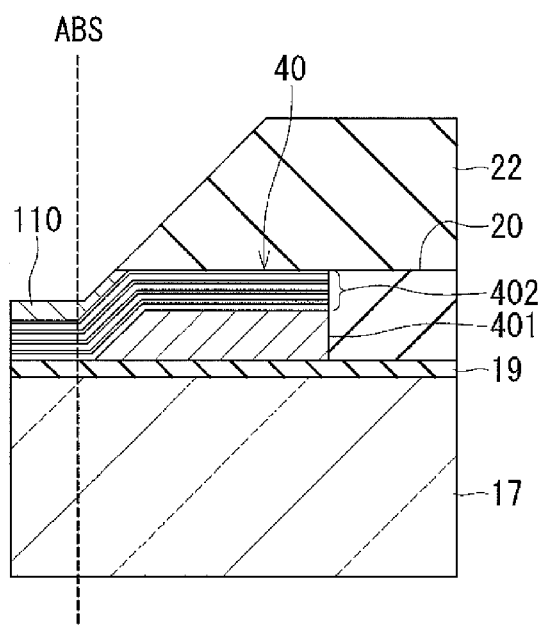
FIG. 24A and FIG. 24B are cross-sectional views showing a step of a method of manufacturing the thermally-assisted magnetic recording head according to the third embodiment of the invention.
Figure 24B:
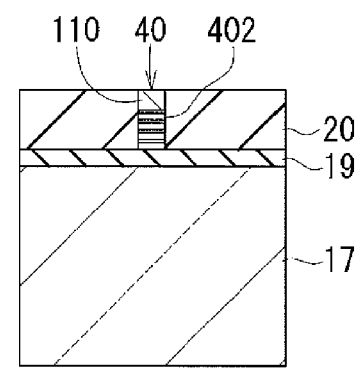

Reference is now made to FIG. 24A and FIG. 24B to describe the method of manufacturing the thermally-assisted magnetic recording head and the method of manufacturing the plasmon generator 40 according to the present embodiment. FIG. 24A and FIG. 24B show a stack of layers formed in the process of manufacturing the thermally-assisted magnetic recording head. Note that portions located below the core 17 are omitted from FIG. 24A and FIG. 24B. FIG. 24A shows a cross section that intersects the end face 24a of the main pole 24 and that is perpendicular to the medium facing surface 60 and the top surface 1a of the substrate 1. FIG. 24B shows a cross section of the stack taken at the position at which the medium facing surface 60 is to be formed. In FIG. 24A, the symbol "ABS" indicates the position at which the medium facing surface 60 is to be formed.

The method of manufacturing the thermally-assisted magnetic recording head and the method of manufacturing the plasmon generator 40 according to the present embodiment are the same as those according to the second embodiment up to the step shown in FIG. 20A and FIG. 20B.

FIG. 24A and FIG. 24B show a step to follow the step of FIG. 20A and FIG. 20B. In this step, the dielectric layer 22 is formed over the multilayer film portion 402 and the dielectric layer 20 in the same manner as the step shown in FIG. 21A and FIG. 21B. Next, an etching mask (not illustrated) is formed on the dielectric layer 22. Then, using this etching mask, the dielectric layers 22 and 20 are taper-etched and a portion of the metal film 110 is removed by IBE, for example. As a result, in the present embodiment the metal film 110 remains on the portion of the multilayer film portion 402 lying on the end face 401a of the metal portion 401 and the cladding layer 19, as shown in FIG. 24A.

A series of steps subsequent to the above-described step in the present embodiment is the same as a series of steps subsequent to the step of FIG. 16A and FIG. 16B in the first embodiment.

The remainder of configuration, function and effects of the present embodiment are similar to those of the second embodiment.

Fourth Embodiment

Figure 25:
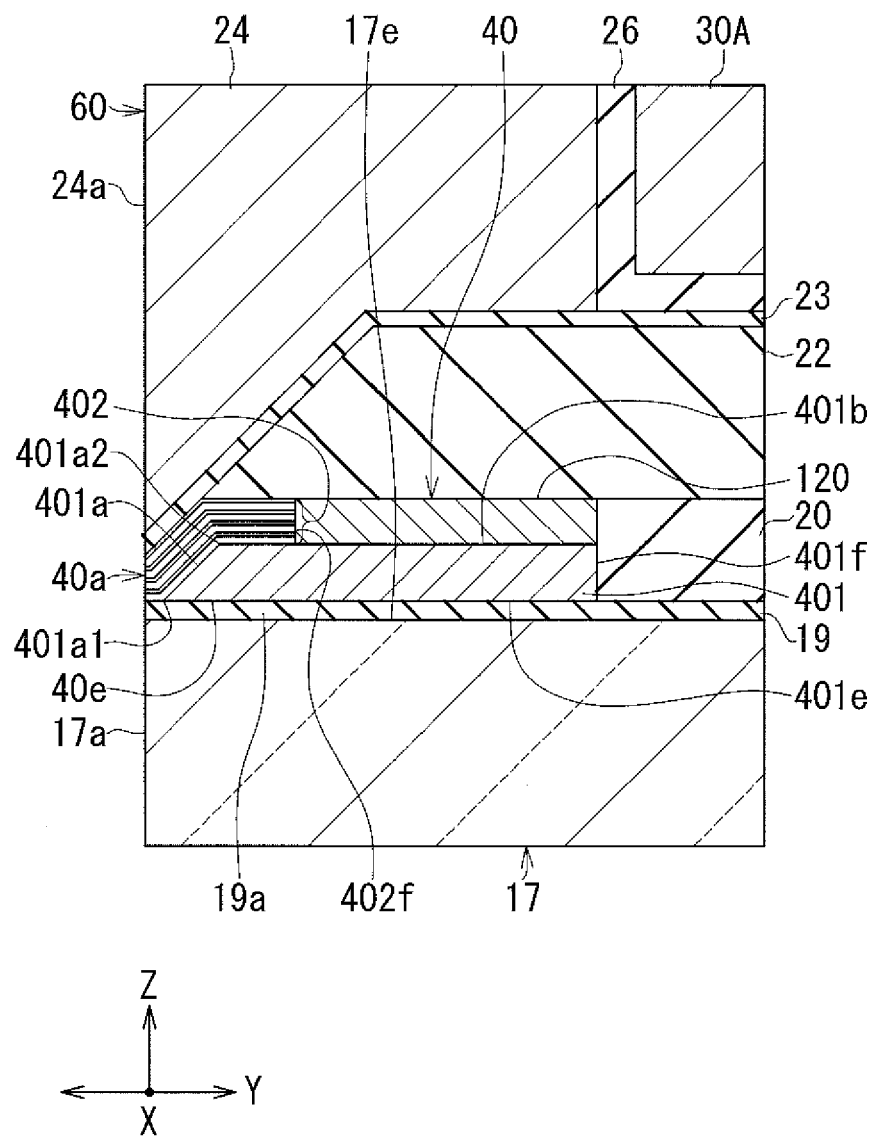
FIG. 25 is a cross-sectional view showing the main part of a thermally-assisted magnetic recording head according to a fourth embodiment of the invention.

A fourth embodiment of the invention will now be described. First, the configurations of the thermally-assisted magnetic recording head and the plasmon generator 40 according to the present embodiment will be described with reference to FIG. 25. FIG. 25 is a cross-sectional view showing the main part of the thermally-assisted magnetic recording head according to the present embodiment.

In the present embodiment, as shown in FIG. 25, the metal portion 401 has a first end 401f farthest from the front end face 40a. The multilayer film portion 402 has a second end 402f farthest from the front end face 40a. The distance from the front end face 40a to the second end 402f is smaller than the distance from the front end face 40a to the first end 401f.

In the present embodiment, the plasmon generator 40 includes a metal film 120 in addition to the metal portion 401 and the multilayer film portion 402. The metal film 120 is formed of a metal material and disposed on a part of the top surface 401b of the metal portion 401 that is located farther from the front end face 40a than is the second end 402f. The metal material used to form the metal film 120 is preferably the first-type metal material described in the first embodiment section.

The metal film 120 is higher in thermal conductivity than the multilayer film portion 402. Thus, the present embodiment allows for easier dissipation of heat generated by the plasmon generator 40 when compared with the first embodiment, thereby allowing for suppressing a temperature rise of the plasmon generator 40.

The method of manufacturing the thermally-assisted magnetic recording head and the method of manufacturing the plasmon generator 40 according to the present embodiment will now be described with reference to FIG. 26A through FIG. 31B. FIG. 26A through FIG. 31B each show a stack of layers formed in the process of manufacturing the thermally-assisted magnetic recording head. Note that portions located below the core 17 are omitted from FIG. 26A through FIG. 31B. FIGS. 26A-31A each show a cross section that intersects the end face 24a of the main pole 24 and that is perpendicular to the medium facing surface 60 and the top surface 1a of the substrate 1. FIGS. 26B-31B each show a cross section of the stack taken at the position at which the medium facing surface 60 is to be formed. In FIGS. 26A-31A, the symbol "ABS" indicates the position at which the medium facing surface 60 is to be formed.

The method of manufacturing the thermally-assisted magnetic recording head and the method of manufacturing the plasmon generator 40 according to the present embodiment are the same as those according to the first embodiment up to the step shown in FIG. 11A and FIG. 11B.

Figures 26A, 26B:
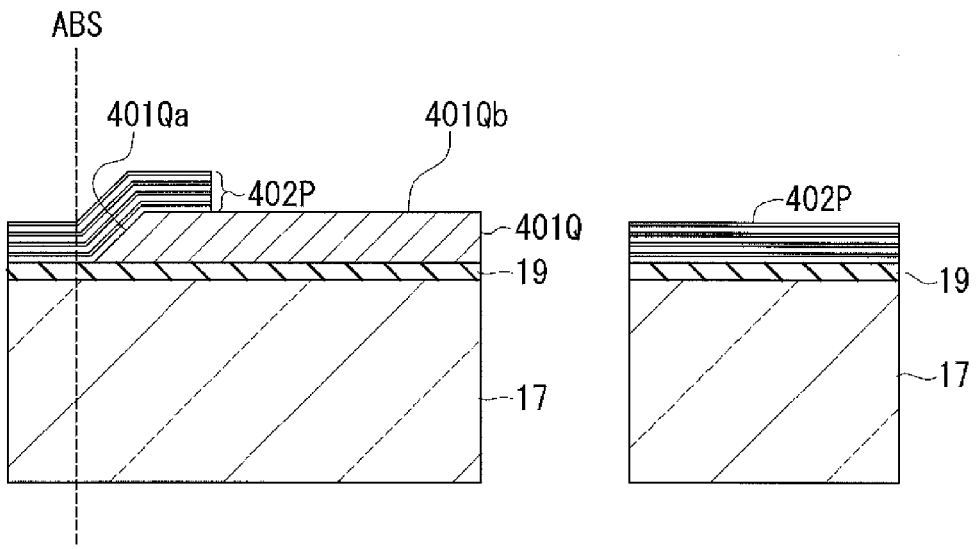
FIG. 26A and FIG. 26B are cross-sectional views showing a step of a method of manufacturing the thermally-assisted magnetic recording head according to the fourth embodiment of the invention.

FIG. 26A and FIG. 26B show a step to follow the step of FIG. 11A and FIG. 11B. In this step, a multilayer film 402P, which later becomes the multilayer film portion 402, is formed by, for example, sputtering, so as to cover a part of the initial metal portion 401Q. In the present embodiment, the multilayer film 402P is formed on a part of the initial top surface 401Qb, on the initial end face 401Qa and on the cladding layer 19, in particular.

Figures 27A, 27B:
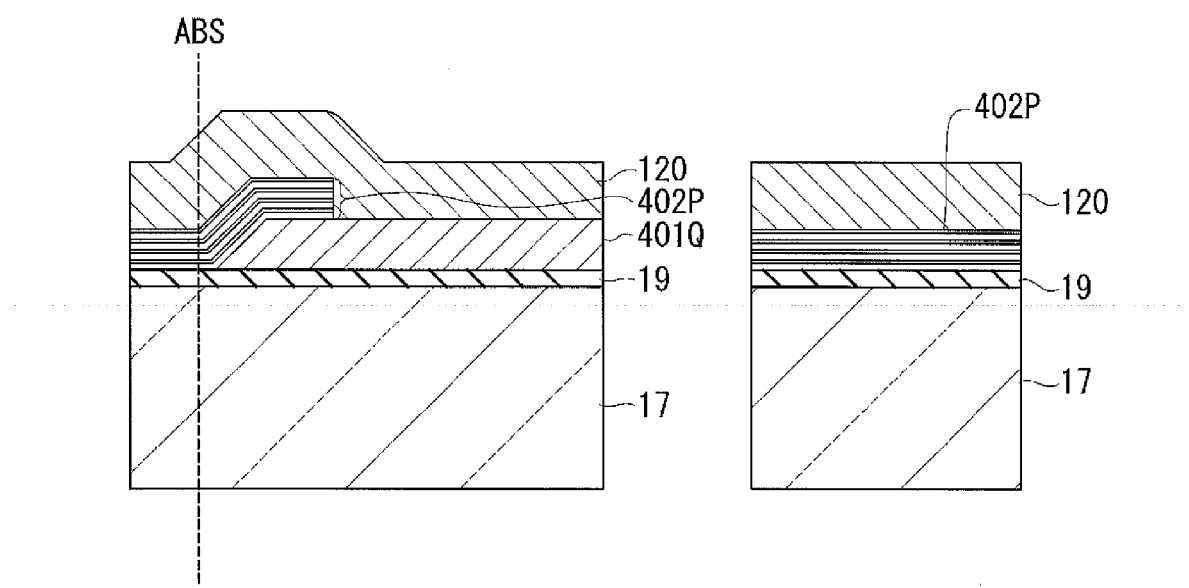
FIG. 27A and FIG. 27B are cross-sectional views showing a step that follows the step shown in FIG. 26A and FIG. 26B.

FIG. 27A and FIG. 27B show the next step. In this step, the metal film 120 is formed on the initial metal portion 401Q and the multilayer film 402P into a thickness equal to or greater than that of the initial metal portion 401Q. The metal material used to form the metal film 120 is preferably the same as the metal material used to form the initial metal portion 401Q (the metal portion 401).

FIG. 28A and FIG. 28B show the next step. In this step, first, the metal film 120 is polished by, for example, CMP, until a part of the multilayer film 402P that lies on the initial metal portion 401Q is exposed. The top surfaces of the metal film 120 and the multilayer film 402P are thereby planarized. Next, an etching mask 123 is formed over the top surfaces of the metal film 120 and the multilayer film 402P. The etching mask 123 is formed by patterning a layer of a photoresist by photolithography, for example. The planar shape of the etching mask 123 corresponds to the planar shape of the plasmon generator 40. Next, portions of the initial metal portion 401Q, the multilayer film 402P and the metal film 120 are etched by, for example, IBE or RIE using the etching mask 123, whereby the initial metal portion 401Q, the multilayer film 402P and the metal film 120 are patterned. The initial metal portion 401Q is patterned into the metal portion 401. The multilayer film 402P is patterned into the multilayer film portion 402.

FIG. 29A and FIG. 29B show the next step. In this step, first, the etching mask 123 is removed. Next, the dielectric layer 20 is formed over the entire top surface of the stack. The dielectric layer 20 is then polished by, for example, CMP, until a part of the multilayer film portion 402 that lies on the metal portion 401 is exposed.

FIG. 30A and FIG. 30B show the next step. In this step, first, the dielectric layer 22 is formed over the multilayer film portion 402, the metal film 120 and the dielectric layer 20. Next, an etching mask (not illustrated) is formed on the dielectric layer 22. Then, using this etching mask, the dielectric layers 22 and 20 are taper-etched and at least part of the metal film 120 remaining on the multilayer film portion 402 is removed by IBE, for example. In this step, as in the third embodiment, the metal film 120 may be allowed to remain on the multilayer film portion 402. This step forms the metal film 120 located on the part of the top surface 401b of the metal portion 401 that is located farther from the front end face 40a than is the second end 402f.

FIG. 31A and FIG. 31B show the next step. In this step, first, the dielectric layer 23 is formed to cover the multilayer film portion 402, the metal film 120 and the dielectric layers 20 and 22. Then, the cladding layer 19 and the dielectric layers 20, 22 and 23 are selectively etched to form therein two openings for exposing the respective top surfaces of the second layers of the coupling portions 14 and 15. Next, the third layers of the coupling portions 14 and 15 are formed on the second layers of the coupling portions 14 and 15, respectively. Then, the main pole 24 is formed on the dielectric layer 23, and the coupling layer 25 is formed on the third layers of the coupling portions 14 and 15 and the dielectric layer 23. The subsequent steps are the same as those in the first embodiment.

The remainder of configuration, function and effects of the present embodiment are similar to those of the second embodiment.

The present invention is not limited to the foregoing embodiments, and various modifications may be made thereto. For example, as far as the requirements of the appended claims are met, the shape of the plasmon generator and the locations of the plasmon generator, the core, and the main pole can be chosen as desired, without being limited to the examples illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A plasmon generator having a front end face, comprising:
   a metal portion; and
   a multilayer film portion, wherein
   the metal portion has a bottom surface, a top surface opposite to the bottom surface, and an end face facing toward the front end face,
   the multilayer film portion includes a first metal layer, a second metal layer and an intermediate layer, and covers the end face and at least part of the top surface of the metal portion,
   the intermediate layer is interposed between the first metal layer and the second metal layer,
   each of the first metal layer, the second metal layer and the intermediate layer has an end located in the front end face,
   each of the metal portion, the first metal layer and the second metal layer is formed of a metal material,
   the intermediate layer is formed of a material that is higher in Vickers hardness than the metal material used to form the metal portion, the metal material used to form the first metal layer and the metal material used to form the second metal layer, and
   the metal portion is greater in thickness than the first metal layer, the second metal layer and the intermediate layer,
   the plasmon generator being configured so that a surface plasmon is excited on the bottom surface of the metal portion through coupling with evanescent light generated from a core through which light propagates, and the front end face generates near-field light based on the surface plasmon.

2. The plasmon generator according to claim 1, wherein the end face of the metal portion is inclined relative to the front end face.

3. The plasmon generator according to claim 1, further comprising a metal film formed of a metal material and stacked on the multilayer film portion,
   wherein the metal film has an end located in the front end face.

4. The plasmon generator according to claim 1, wherein
   the metal portion has a first end farthest from the front end face,
   the multilayer film portion has a second end farthest from the front end face, and
   a distance from the front end face to the second end is smaller than a distance from the front end face to the first end.

5. The plasmon generator according to claim 4, further comprising a metal film formed of a metal material and disposed on a part of the top surface of the metal portion that is located farther from the front end face than is the second end.

6. The plasmon generator according to claim 1, wherein no part of the metal portion constitutes any part of the front end face.

7. The plasmon generator according to claim 1, wherein the intermediate layer is smaller in thickness than the first and second metal layers.

8. The plasmon generator according to claim 1, wherein the material used to form the intermediate layer is a metal material different from the metal material used to form the metal portion, the metal material used to form the first metal layer and the metal material used to form the second metal layer.

9. The plasmon generator according to claim 1, wherein the material used to form the intermediate layer is a dielectric material.

10. A method of manufacturing the plasmon generator of claim 1, comprising the steps of:
    forming an initial metal portion that later becomes the metal portion;
    forming a multilayer film to cover at least part of the initial metal portion, the multilayer film becoming the multilayer film portion later; and
    patterning the initial metal portion and the multilayer film so that the initial metal portion is made into the metal portion and the multilayer film is made into the multilayer film portion.

11. The method of manufacturing the plasmon generator according to claim 10, further comprising:
    the step of forming a metal film on the multilayer film between the step of forming the multilayer film and the step of patterning, the metal film having a thickness equal to or greater than that of the initial metal portion; and
    the step of planarizing top surfaces of the metal film and the multilayer film between the step of forming the metal film and the step of patterning,
    wherein the initial metal portion, the multilayer film and the metal film are patterned in the step of patterning.

12. The method of manufacturing the plasmon generator according to claim 11, further comprising the step of removing at least part of the metal film after the step of patterning.

13. A thermally-assisted magnetic recording head comprising:
    a medium facing surface facing a recording medium;
    a main pole producing a write magnetic field for writing data on the recording medium;
    a waveguide including a core through which light propagates, and a cladding provided around the core; and
    a plasmon generator having a front end face located in the medium facing surface, wherein
    the plasmon generator includes a metal portion and a multilayer film portion,
    the metal portion has a bottom surface, a top surface opposite to the bottom surface, and an end face facing toward the front end face,
    the multilayer film portion includes a first metal layer, a second metal layer and an intermediate layer, and covers the end face and at least part of the top surface of the metal portion,
    the intermediate layer is interposed between the first metal layer and the second metal layer,
    each of the first metal layer, the second metal layer and the intermediate layer has an end located in the front end face,
    each of the metal portion, the first metal layer and the second metal layer is formed of a metal material,
    the intermediate layer is formed of a material that is higher in Vickers hardness than the metal material used to form the metal portion, the metal material used to form the first metal layer and the metal material used to form the second metal layer,
    the metal portion is greater in thickness than the first metal layer, the second metal layer and the intermediate layer, and
    the plasmon generator is configured so that a surface plasmon is excited on the bottom surface of the metal portion through coupling with evanescent light generated from the core, and the front end face generates near-field light based on the surface plasmon.

14. The thermally-assisted magnetic recording head according to claim 13, wherein the end face of the metal portion is inclined relative to the front end face.

15. The thermally-assisted magnetic recording head according to claim 13, wherein
the plasmon generator further includes a metal film formed of a metal material and stacked on the multilayer film portion, and
the metal film has an end located in the front end face.

16. The thermally-assisted magnetic recording head according to claim 13, wherein
the metal portion has a first end farthest from the front end face,
the multilayer film portion has a second end farthest from the front end face, and
a distance from the front end face to the second end is smaller than a distance from the front end face to the first end.

17. The thermally-assisted magnetic recording head according to claim 16, wherein the plasmon generator further includes a metal film formed of a metal material and disposed on a part of the top surface of the metal portion that is located farther from the front end face than is the second end.

18. The thermally-assisted magnetic recording head according to claim 13, wherein no part of the metal portion constitutes any part of the front end face.

19. The thermally-assisted magnetic recording head according to claim 13, wherein the intermediate layer is smaller in thickness than the first and second metal layers.

20. The thermally-assisted magnetic recording head according to claim 13, wherein the material used to form the intermediate layer is a metal material different from the metal material used to form the metal portion, the metal material used to form the first metal layer and the metal material used to form the second metal layer.

21. The thermally-assisted magnetic recording head according to claim 13, wherein the material used to form the intermediate layer is a dielectric material.

22. The thermally-assisted magnetic recording head according to claim 13, wherein
the core has an evanescent light generating surface that generates the evanescent light based on the light propagating through the core, and
the cladding includes an interposition part interposed between the evanescent light generating surface and the bottom surface of the metal portion.

* * * * *